United States Patent [19]
van Buul et al.

[11] 4,090,218
[45] May 16, 1978

[54] METHOD OF, AND APPARATUS FOR, MANUFACTURING A VIDEO RECORD

[75] Inventors: Marinus Cornelis Willem van Buul; Jan August Marcel Hofman; Leendert Johan van de Polder; Sing Liong Tan, all of Eindhoven, Netherlands

[73] Assignee: U.S. Philips Corporation, New York, N.Y.

[21] Appl. No.: 666,691

[22] Filed: Mar. 15, 1976

Related U.S. Application Data

[63] Continuation-in-part of Ser. No. 579,016, May 19, 1975, abandoned.

[30] Foreign Application Priority Data

Mar. 24, 1975 Netherlands .......................... 7503461
Aug. 10, 1975 Netherlands .......................... 7511784

[51] Int. Cl.$^2$ ......................... H04N 5/14; H04N 5/76; H04N 5/14
[52] U.S. Cl. ..................................... 358/37; 358/128; 358/162
[58] Field of Search ........................ 358/9, 21, 37, 128, 358/130, 132, 162

[56] References Cited

U.S. PATENT DOCUMENTS

| | | | |
|---|---|---|---|
| 3,629,498 | 12/1971 | Tan ........................................ | 358/162 |
| 3,919,470 | 11/1975 | Blom et al. ............................ | 358/162 |
| 3,952,327 | 4/1976 | Hofman et al. ........................ | 358/37 |

*Primary Examiner*—Howard W. Britton
*Assistant Examiner*—Aristotelis M. Psitos
*Attorney, Agent, or Firm*—Frank R. Trifari; Simon L. Cohen

[57] ABSTRACT

When the information of a continuous-motion video record is displayed in the stop-motion mode by repeated display of two fields which form an interlaced picture, motion in the scene gives rise to a frame-frequency flicker phenomenon in the stop-motion picture. By forming suitable video signal combinations in discrete groups which each comprise two associated fields and by recording these combinations in the video record, the flicker phenomenon in a stop-motion picture is eliminated without continuous display being perceptibly affected.

24 Claims, 31 Drawing Figures

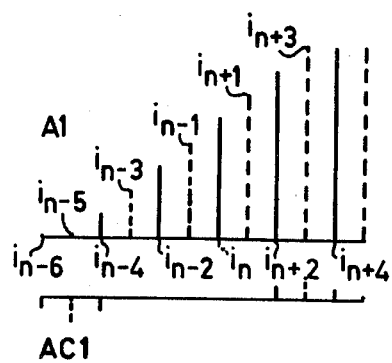
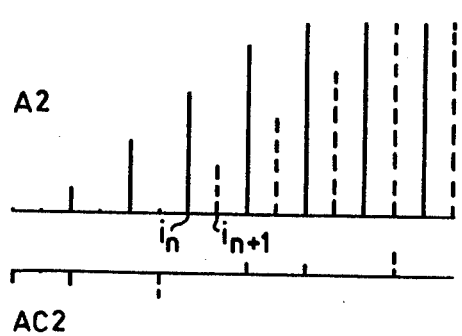
Fig. 2a   Fig. 2b
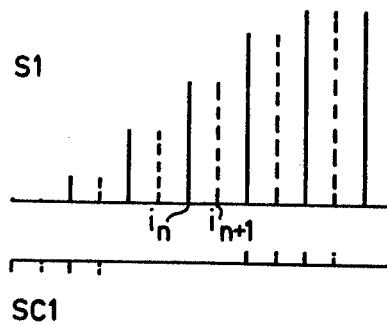
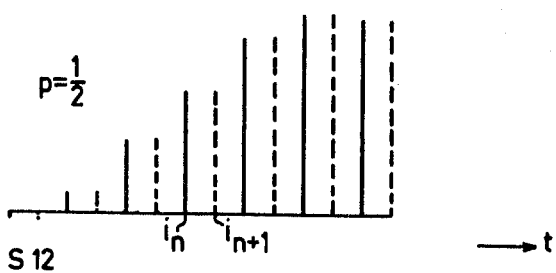
Fig. 2c

| | | |
|---|---|---|
| A | $i^N_{n+2}$ | $i^{N+1}_{n+3}$ |
| B | $i^N_n$ | $i^{N+1}_{n+1}$ |
| C | $i^N_{n-2}$ | $i^{N+1}_{n-1}$ |
| D | $i^N_n + i^N_{n-2}$ | ... |
| E | ... | $\dfrac{i^N_{n+2}+i^N_n}{2}$ |
| AC/E | $i^N_n - \dfrac{i^N_{n-2}+i^N_{n+2}}{2}$ | $\dfrac{i^N_{n+2}+i^N_n}{2} - \dfrac{i^{N+1}_{n-1}+i^{N+1}_{n+3}}{2}$ |
| F | $i^{N'}_n = i^N_n + p\left(i^N_n - \dfrac{i^N_{n-2}+i^N_{n+2}}{2}\right)$ | $i^{N+1'}_{n+1} = i^{N+1}_{n+1} + q\left(\dfrac{i^N_{n+2}+i^N_n}{2} - \dfrac{i^{N+1}_{n-1}+i^{N+1}_{n+3}}{2}\right)$ |

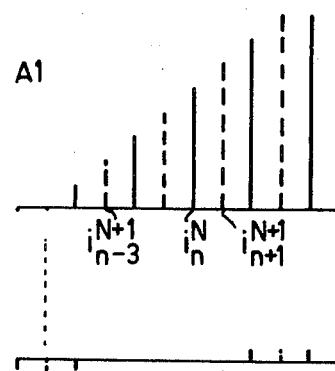
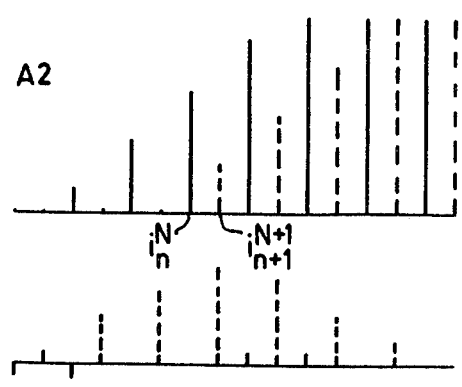
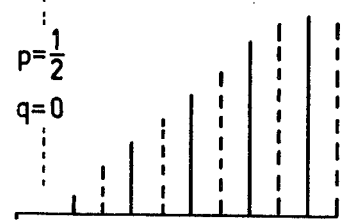
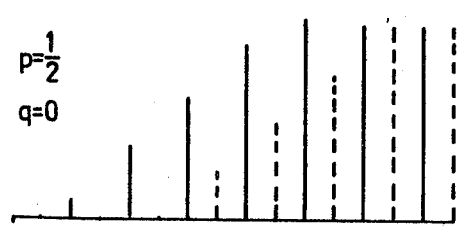
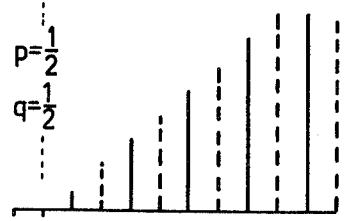
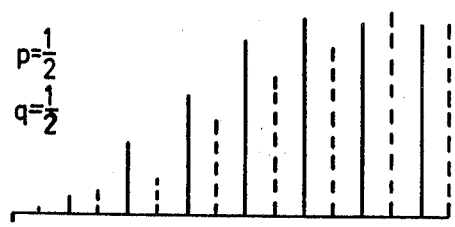
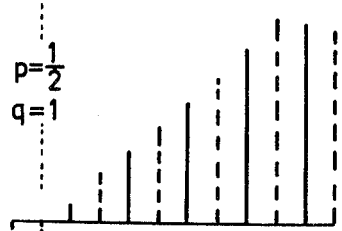
Fig. 4a  Fig. 4b

| | | |
|---|---|---|
| A | $i^N_{n+2}$ | $i^{N+1}_{n+3}$ |
| B | $i^N_n$ | $i^{N+1}_{n+1}$ |
| C | $i^N_{n-2}$ | $i^{N+1}_{n-1}$ |
| ABC | $i^N_n - \dfrac{i^N_{n-2}+i^N_{n+2}}{2}$ | $i^{N+1}_{n+1} - \dfrac{i^{N+1}_{n-1}+i^{N+1}_{n+3}}{2}$ |
| D | $i^N_n + i^N_{n-2}$ | ... |
| E | ... | $\dfrac{i^N_{n+2}+i^N_n}{2}$ |
| F | $i^{N'}_n = i^N_n + p\left(i^N_n - \dfrac{i^N_{n-2}+i^N_{n+2}}{2}\right)$ | $i^{N+1'}_{n+1} = \dfrac{i^N_{n+2}+i^N_n}{2} + q\left(i^{N+1}_{n+1} - \dfrac{i^{N+1}_{n-1}+i^{N+1}_{n+3}}{2}\right)$ |

| | | |
|---|---|---|
| A | $i_n^N$ | $\cdots$ |
| B | $i_{n-1}^{N-1}$ | $i_n^N$ |
| C | $\cdots$ | $i_{n+1}^{N-1}$ |
| D | $\dfrac{i_n^N + i_{n-1}^{N-1}}{2}$ | $\cdots$ |
| E | $\cdots$ | $\dfrac{i_n^N + i_{n+1}^{N-1}}{2}$ |
| F | $i_n^{N'} = \dfrac{i_n^N + i_{n-1}^{N-1}}{2}$ | $i_{n+1}^{N+1'} = \dfrac{i_n^N + i_{n+1}^{N-1}}{2}$ |

| | | | |
|---|---|---|---|
| A | $i^{N-1}_{n-1}$ | $i^{N}_{n}$ | $i^{N+1}_{n+1}$ |
| B | $i^{N-1}_{n-1}$ | $i^{N}_{n} + i^{N-1}_{n-1}$ | $i^{N+1}_{n+1}$ |
| C | ... | $i^{N-1}_{n+1}$ | $i^{N}_{n+2} + i^{N-1}_{n+1}$ |
| D | ... | $i^{N-1}_{n-1}$ | ... |
| E | ... | $\dfrac{i^{N}_{n} + i^{N-1}_{n+1}}{2}$ | ... |
| F | ... | ... | $\dfrac{i^{N}_{n+2} + i^{N-1}_{n+1}}{2}$ |
| G | ... | $i^{N'}_{n} = \dfrac{i^{N}_{n} + i^{N-1}_{n+1}}{2}$ | $i^{N+1'}_{n+1} = \dfrac{i^{N}_{n+2} + i^{N-1}_{n+1}}{2}$ |

| | | |
|---|---|---|
| A | $i_n^N$ | $i_{n+1}^{N+1}$ |
| B | $i_{n+1}^{N-1}$ | $i_{n+2}^N$ |
| C | $i_{n-1}^{N-1}$ | $i_n^N$ |
| D | ... | $i_{n+1}^{N-1}$ |
| E | $\frac{1}{2}i_n^N + \frac{1}{4}i_{n+1}^{N-1} + \frac{1}{4}i_{n-1}^{N-1}$ | ... |
| F | ... | $\frac{1}{4}i_{n+2}^N + \frac{1}{4}i_n^N + \frac{1}{2}i_{n+1}^{N-1}$ |
| G | $i_n^{N'} = \frac{1}{2}i_n^N + \frac{1}{4}i_{n+1}^{N-1} + \frac{1}{4}i_{n-1}^{N-1}$ | $i_{n+1}^{N+1'} = \frac{1}{2}i_{n+1}^{N-1} + \frac{1}{4}i_{n+2}^N + \frac{1}{4}i_n^N$ |

METHOD OF, AND APPARATUS FOR, MANUFACTURING A VIDEO RECORD

This is a Continuation-in-part of patent application Ser. No. 579,016, filed May 19, 1975.

The invention relates to a method of manufacturing a video record containing video information provided in substantially circular tracks and intended for reproduction by means of a television display apparatus, which video information occurs in line periods and in field periods comprising the line periods, while the video information of two field periods which is recorded in a single-turn or multi-turn circular track produces a frame period, and interlaced picture in the display device. The video record is suitable for reproduction in the display device in a sequence of more than two consecutive field periods for producing a television picture containing motion and for repeated display of two consecutive field periods for obtaining a stop-motion television picture. The invention also relates to apparatus for carrying out the method and to a video record manufactured by the method.

In Philips Technical Review 1973, No. 7, pages 178–180, a video display system using a video record or disc as the information carrier is described. The video information is provided on the video record in a coded manner in the form of a pattern of pits which have variable length and repetition frequency. The substantially circular or spiral track in which the pit pattern is arranged is scanned by means of a light spot and the reflected light is converted into an electric signal with the aid of a photodiode. A video signal is derived from the electric signal by means of decoding and is suitable for display in a standard television display apparatus.

In display, light spot scanning enables a stop-motion or still television picture to be obtained by repeated scanning of a single-turn or multi-turn circular track which contains the information associated with a television frame comprising two interlaced fields. The same possibility is given, for example, by using magnetic scanning of a magnetic information on the video record or disc. By contrast, this possibility is lacking in a system using a video record provided with an information track in a spiral groove and mechanical groove scanning, for in such a system the scanning member cannot return from the end of the second field to the beginning of the first field at a speed high enough for repeated display of two fields which together form the television frame.

In a video record display system which includes the possibility of a stop-motion television picture produced by repeated display of the information of two fields, such display normally gives rise to a flicker phenomenon which does not occur in continuous display. This is due to the occurrence of motion which takes place in the scene televised in the interval between the pick-up instants of the two fields. Repeated display of the two fields including the information shift between the two partial pictures, which shift is due to the motion in the scene, gives rise to the flicker phenomenon and it occurs at frame frequency.

It is an object of the present invention to provide a stop-motion television picture produced by repeated display of two interlaced fields containing video information without the occurrence of troublesome flicker due to movement taking place in the televized scene. A further requirement is that picture quality should be optimal, in the continuous or normal mode of display, which means that during continuous display of the information provided on the video record by the method according to the invention, picture quality should not be appreciably affected. For this purpose the method according to the invention of manufacturing a video record or disc is characterized in that, in order to prevent troublesome flicker phenomena during display of a stop-motion television picture, the video information supplied serially in consecutive field periods is divided, for recording on the video record, in discrete groups which each comprise two field periods, in which groups the video information of the first and second field periods themselves or of preceding field periods, after delaying the video signal, first is combined and then the combined group information of the resulting associated two field periods is recorded on the video record.

According to a feature of the invention the method may be further characterized in that during the recording of the video information on the video record a picture synchronizing signal is used for locating the starting points of the discrete groups which each comprise two associated field periods.

An apparatus suitable for carrying out a method according to the invention is characterized in that it comprises at least one delay device having a delay time of substantially one field period between an input terminal and an output terminal, at least two superposition stages, at least one switching device having two input terminals and one output terminal, and a switching-signal generator for supplying a switching signal which switches the switching device at each field period. The output terminal of the switching device is coupled to a first output terminal of the apparatus while the input terminal of the delay device is coupled to an input terminal of the apparatus, the superposition stages for combining the signals being connected between terminals of the apparatus, of the delay device and of the switching device.

According to a feature of the invention the apparatus may be characterized in that it has a second output terminal which for picture synchronizing signal output is connected, via a divide-by-two frequency divider stage, to an output of the said switching-signal generator.

A video record manufactured according to a method and/or by means of an apparatus according to the invention is characterized in that the video information recorded in the substantially circular tracks on the record is provided in discrete groups which each comprise two associated field periods, as in each group the information of the first field differs from that in the second field in a comparatively unimportant degree only, while the video information of a group may considerably differ from that of the next group.

According to a feature of the invention a video record may be further characterized in that in addition to the line and field synchronizing information required according to a television standard and present in the substantially circular tracks on the video record there is provided picture synchronizing information which determines the discrete groups which each consist of two associated field periods.

Embodiments of the invention will now be described, by way of example, with reference to the accompanying diagrammatic drawings, in which:

FIG. 2 shows time amplitude versus time diagrams,

FIGS. 4 and 5 show amplitude versus time diagrams appertaining to the apparatus of FIG. 3, FIGS. 6 to 10 show further embodiments of apparatus.

Figure 1A:
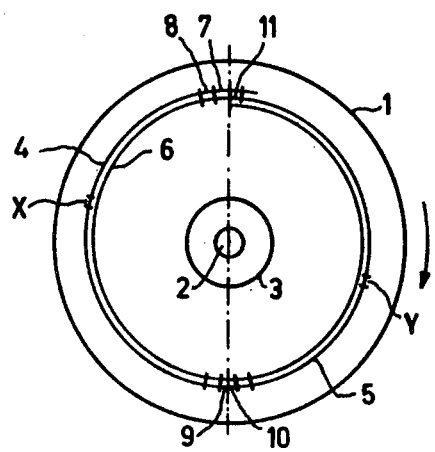
FIG. 1 illustrates the flicker phenomenon which occurs in repeated display of the information of two field periods provided on a video record or disc, which phenomenon is to be corrected.

Referring now to FIG. 1, FIG. 1a is a plan view of a video record or disc 1. The record 1 is provided with a center hole for insertion of a spindle of a turn table. Video information is provided on the record 1 from near the outer circumference to an inner circle 3. The video information is provided in spiral tracks three semicircles of which are designated by references 4, 5 and 6. Because the track is in the form of a spiral, the semi-circles 4, 5 and 6 are not ideally but substantially circular. The semicircles 4, 5 and 6 are each contain the video information associated with a television field as defined in a television standard. The video information recorded in coded form may be provided in the form of, for example, a pit pattern which is scanned by means of a light spot or a magnetic pattern which can be read by magnetic scanning. Apart from mechanical scanning of information in a grooved track the method of providing the information is of minor importance.

In the manner generally used in television the video and synchronizing information is in the form of interlaced television fields which comprise television lines and which cooperate in pairs to form complete pictures. In the semicircle 4 a first line is designated by reference 7, a second line by reference 8. The semicircle 4 ends with a half line 9. The semicircle 5 begins with the information of a half line 10 and ends with an entire line 11. The information in the semicicle 6 is provided in the same manner as in the semicircle 4. In the manner commonly used in television, the entire and half lines 7, 8, 11 and 9, 10 include field synchronizing information.

Starting with the semicircle 5, during display an interlaced television picture is re-constituted in conjunction with either the preceding field of the semicircle 4 or the succeeding field of the semicircle 6. The same applies to the field of the semicircle 4 in conjunction with either the preceding field or the succeeding field 5, and to the semicircle 6 in conjunction with either the preceding field 5 or the succeeding field. Thus two consecutive fields can always form an interlaced picture.

Figure 1B:
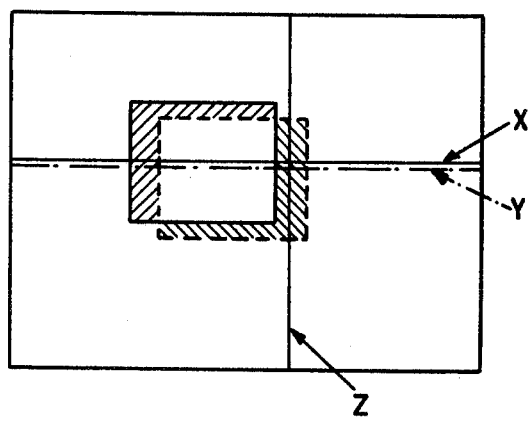

FIG. 1b shows an interlaced picture as displayed. Reference symbol X denotes a displayed television line the information of which is derived, for example, from the semicircle 4 on the video record 1 of FIG. 1a. Reference symbol Y denotes a displayed television line the information of which is derived, for example, from the semicircle 5 on the video record 1 of FIG. 1a. Reference symbol Z denotes a line being in the field scanning direction in FIG. 1b.

FIG. 1b shows two congruent rectangles, the one in solid lines being associated with the field given by the information from the semicircle 4 and the other, in dotted lines, being associated with the field produced by the information from the semicircle 5 in FIG. 1a. During display a stop-motion picture is obtained by repeated display of the information from the semicircles 4 and 5 in that at the end of the line 11 of the semicircle 5 the information scanning abruptly returns to the beginning of the line 7 of the semicircle 4. If instead of the spiral form the information tracks were ideally circular comprising ideal semicircles 4 and 5, this abrupt return would not be required to obtain a stop-motion picture, but scanning would have to pass abruptly from one semi-circle to the next for continuous display of the usual television picture. To permit such jumps without affecting the displayed picture, the beginning and the end of the track must be closely adjacent so that a complete circular track is required although a multiturn circular track may also be used to produce a picture.

Figure 1C:
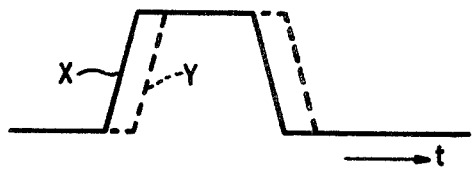

FIG. 1b shows that there is a shift when displaying the rectangle in one field (line X) and in the other field (line Y). In FIG. 1c the information of the lines X and Y is plotted as a function of time.

Figure 1D:
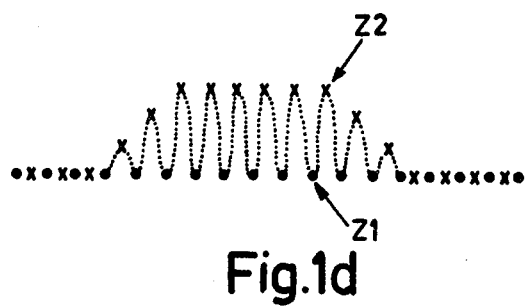

In FIG. 1d the information contained in the line Z of FIG. 1b is plotted. The instantaneous information in the line z, which is in the form of samples of information of the lines in one field and in the other is drawn as a dot Z1 or a cross Z2. Assuming the line X of FIG. 1b to be associated with the information of the semicircle 4 of FIG. 1a, the information samples from the semicircle 4 will be given by the dots Z1 in FIG. 1d. The information at the crosses Z2 of FIG. 1d is then associated with information samples from the semicircle 5 of FIG. 1a. The shift, which in FIG. 1b is shown by shading, gives rise to a flicker phenomenon at frame frequency, because in the shaded areas one field may have, for example, black information while the other frame has the white information.

FIG. 2 shows amplitude versus time diagrams which can be compared to those of FIG. 1d. Thus, the vertical line in this FIG. represent the instantaneous voltage or points on successive horizontal scan lines, all the points being on the vertical line Z. The information samples from one field and from the other are shown in FIG. 2 as solid and dotted lines respectively. In FIG. 2a a signal A1 represents a transition in the field scanning direction (line Z of FIG. 1b) which has not been shifted in a field period. References $i_{n-6}, i_{n-4}, i_{n-2}, i_n, i_{n+2}$, and $i_{n+4}$ designate the information samples present in a given field, where $n$ is an odd integer. Owing to the interlace the preceding and succeeding fields contain the information samples $i_{n-5}, i_{n-3}, i_{n-1}, i_{n+1}, i_{n+3}$ and $i_{n+5}$.

In FIG. 2a reference AC1 denotes a signal which is produced in television to provide the usual vertical aperture correction. The aperture correction is used for improving the picture quality during display and consists in that two gently sloping signal transition correction signals (AC1) are added for making the slope steeper so that a greater signal difference is obtained between initial value and final value. Hereinafter we will discuss in greater detail the manner in which the vertical aperture correction signal AC1 is derived. The signal AC1 is multiplied by a factor $p = \frac{1}{2}$ and then added to the signal A1 so that an aperture-corrected signal F1 is obtained.

FIG. 2b shows a signal A2 in which the information samples drawn in solid lines ($i_n$ etc.) are identical with those in signal A1 of FIG. 2a, but the information samples drawn as dotted lines are shifted to the right by two places. The magnitude of the information $i_{n-3}$ in signal A1 of FIG. 2a now constituted the information $i_{n+1}$ of FIG. 2b, i.e. the information is shifted downwards by two lines in its field (FIG. 1b). This shift is assumed to have taken place almost immediately after local scanning was effected in the preceding field during the televising of the scane. Only the relevant information is shifted but its (shifted) magnitude is not affected. In practice, shifting will not take place immediately after local scanning and it will take a certain time, so that not only an information shift occurs but also a certain levelling of the information magnitude takes place. To simplify the explanation of the invention this effect has been left out of account. It is further assumed that while televising there has been no open space between the lines in each television field so that while televising the effective light integration time is equal to a field period. If there had been an open space, which corresponds to ideal interlacing between two successive fields, the effective light integration time would have been equal to a frame period lasting two field periods.

In FIG. 2d a vertical aperture correction signal AC2 is plotted which signal can be derived from the signal AC1 of FIG. 2a by shifting each dotted information sample in its field by two lines. In FIG. 2b a signal F2 represents a signal for display which is corrected in vertical aperture by a factor of $p = \frac{1}{2}$.

A comparison of the signal F1 of FIG. 2a and signal F2 of FIG. 2b shows that when the signal F2, including the shift, is displayed, flicker will occur. From the signals A2 and F2 it follows that the flicker phenomenon is enhanced by the vertical aperture correction.

To prevent or reduce the flicker of the display which is illustrated by the signal F2 of FIG. 2b the information of one field may be repeated in the other field period, with the result that a signal S1 (FIG. 2c) is obtained. The information shown by solid lines in signal A2 of FIG. 2a is passed via a delay device having a delay time of a field period plus one half of a line period and is repeated in the next subsequent field shown by dashed lines instead of the shifted information. Thus a vertical aperture correction signal as shown at SC1 occurs, which results in a signal S12 for use in the display.

With respect to the flicker phenomenon the signal S12 of FIG. 2c provides an improvement relative to the signal F2 of FIG. 2b. However, there are considerable disadvantages in the form of a reduction of the definition in the vertical direction to one half and the occurrence of a vertical pattern (with strips in the horizontal direction) due to the stepped or staircase nature of the signal S12.

For the purpose of obtaining a flicker-compensated image during display without the introduction of disturbing phenomena FIG. 3 shows an apperatus in accordance with the invention suitable for providing the information for the tracks on a video record.

Figure 3B:
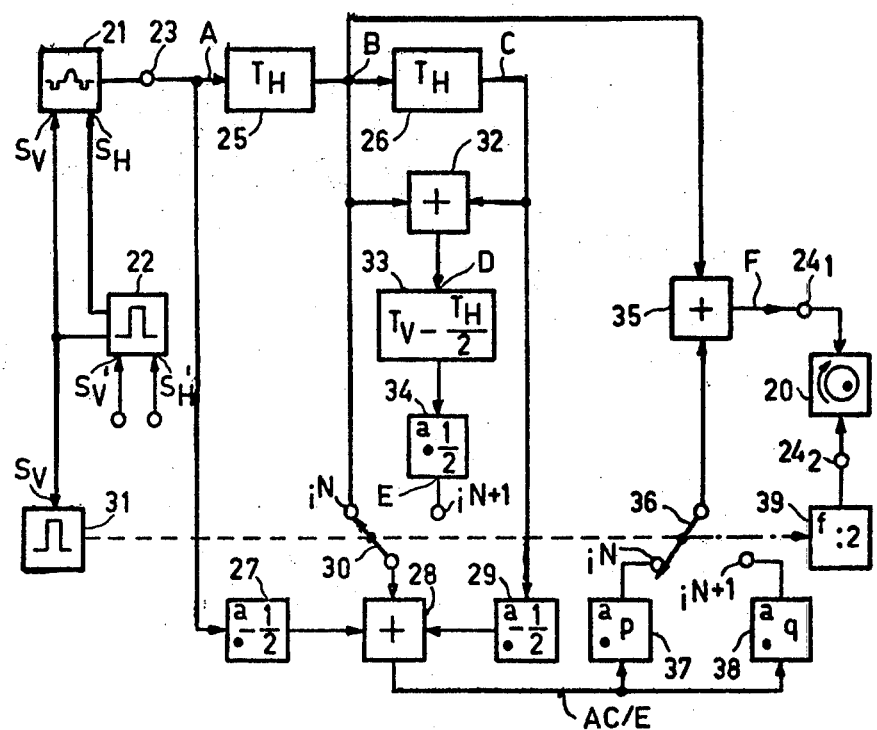
FIG. 3 shows an apparatus for carrying out a method according to the invention.

FIG. 3a shows the apparatus, and in order to illustrate signal processing therein, FIG. 3b shows signals A, B, C, D, E, AC/E and F in the form of instantaneous information samples i. In FIG. 3a reference numeral 20 denotes a device by which the information tracks which contain video and synchronizing information in coded form are recorded on a video record or disc. By way of example, the information tracks can be formed in the aforementioned manner as a pit pattern or a magnetic pattern. The construction of the device 20 is of minor importance to the invention and hence will not be given in detail. Reference numeral 21 denotes a video signal source which may be a television camera televising a scene or a television record or disc from which the information is derived. The signal source 21 is connected to outputs of a signal generator 22 to which external synchronizing signals $S'_V$ and $S'_H$ are applied and which delivers signals $S_V$ and $S_H$. The signals $S_V$ and $S_H$ are, for example, the field (V) and line (H) synchronizing and blanking signals according to a television standard. These signals, if desired in modified form, are used for controlling the signal source 21 and may be included (unmodified) in the camera video signal A delivered by the video signal source 21. The structure of the signals $S_V$ and $S_H$ is not relevant to the invention and hence will not be given in detail.

The video signal output of the source 21 is connected to an input terminal 23 of the particular embodiment of apparatus according to the invention, shown in FIG. 3a and said apparatus has a first output terminal 24, for delivering a modified video signal F and a second output terminal 24$_2$ for delivering a picture synchronizing signal, which outputs are connected to inputs of the device 20. The input terminal 23 is connected to a series combination of two delay devices 25 and 26 which each have a signal delay time equal to a line period $T_H$. Via a signal amplitude multiplier stage 27 constructed as an attenuator and generally denoted by an a) having a multiplying factor of $-\frac{1}{2}$ the input terminal 23, to which the signal A is supplied, is connected to a first input terminal of a superposition stage 28 constructed as an adder stage. The output terminal of the delay device 26, at which a signal C appears, is connected via an attenuator 29 having a multiplying factor of $-\frac{1}{2}$ to a second input terminal of the stage 28. A third input terminal of the stage 28 is connected to the output terminal of a switching device 30 provided with two input terminals. The switching device 30 is controlled by the output of a switching signal generator 31 to which the signal $S_V$ is supplied. Thus during one field period one input terminal $i^N$ of the device 30 to its output terminal and during the other field period the other input terminal $i^{N+1}$ is connected. The field periods will be designated by N, where N = 1, 2, 3, ... etc. To emphasize the switching at the field periods and the position of the switching device 30, its input terminals are provided by the designations $i^N$ and $i^{N+1}$, where $i^N = i^{N+2} = i^{N+4}$ etc. and $i^{N+1} = i^{N+3}$ and $i^{N+5}$ etc.

The input terminal $i^N$ of the switching device 30 is connected to the junction of the delay devices 25 and 26 which junction carries a signal B. The delay device 26 is shunted by a superposition stage 32. The output terminal of the stage 32, which carries a signal D, is connected to a delay device 33 which has a delay time ($T_V - T_H/2$) which is substantially equal to a field period ($T_V$). Since the delay time ($T_V - T_H/2$) is equal to a field period $T_V$ minus one half of a line period $T_H$, when instantaneous information from a line in a field, i.e. from a given location on that line, is supplied, the information from the corresponding location of the underlying or subjacent line of the preceding field appears at the output terminal of the device 33. In general, it follows that when an information samp $i_{n+1}^{N+1}$ is supplied, the information $i_{N+2}^N$ appears, at the output terminals of the device 33 where for the numbering of the field periods N = 1, 2, 3, 4 ... and for the numbering of the lines n = 1, 3, 5 ... up to and including the odd number of lines which, according to the television standard used, constitute a frame composed of two interlaced fields.

The output terminal of the delay device 33 is connected via an attenuator 34, having a multiplying factor of $\frac{1}{2}$ to the terminal $i^{N+1}$ of the switching device 30 at which a signal E appears in this case. The junction of the delay devices 25 and 26 which carries the signal B is also connected to an input terminal of a superposition stage 35 the output terminal of which, carrying a signal F, is connected to the output terminal $24_1$ of the apparatus. Another input terminal of the stage 35 is connected to an output terminal of a switching device 36 having two input terminals $i^N$ and $i^{N+1}$. These are connected, via a signal amplitude multiplier stage 37, having a multiplying factor of $p$, and via a signal amplitude multiplier stage 38, having a multiplying factor of $q$, respectively to the output terminal of the stage 28 which carries a signal AC/E. The switching device 36 is controlled, like the switching device 30, by the switching-signal generator 31 and is correspondingly switched.

To obtain a frame synchronizing signal at the output terminal $24_2$ this terminal is coupled via a divide-by-two frequency divider stage 39 to the switching-signal generator 31.

For simplicity the switching devices 30 and 36 are shown as having mechanical switch blades, but in practice they will be electronic devices. Furthermore the attenuators 27 and 29 may be incorporated in the superposition stage 28, and this also applies to the stages 34 and 32 and to further stages to be described hereinafter. The switching device 36 need not succeed the stages 37 and 38 but may alternatively precede them.

The apparatus shown in FIG. 3a is provided with a vertical aperture correction circuit comprising the components 25, 26, 27, 28, 29, 35 and 37. In the positions of the switching devices 30 and 36 shown in FIG. 3a this vertical aperture correction circuit (25 to 29, 35, 37) operates in known manner. This is illustrated in FIG. 3b by a few instantaneous information samples $i$ provided with the field numbering N (= 1,2,3, . . . ) and the line numbering $n$ (= 1,3,5, . . . ). At the places at which the information is irrelevant to the explanation of the invention, three points appear in FIG. 3b, as will also be the case in the following Figures When a video signal $A = i_{n+2}^N$ is applied, after the delay devices 25 or 26 respectively the information from one line or two lines earlier in the same field occurs, which makes a difference of 2 with the $n$ numbering given, so that $B = i_n^N$ and C is $i_{n-2}^N$ respectively. Consequently the superposition stage 28 delivers a correction signal $AC/E = i_{n-1}^N (i_{n-2}^N + i_{n+2}^N)$ which after the superposition stage 35 results in the vertical-aperture corrected signal $F = i_n^N + p [i_n^N - \frac{1}{2}(i_{n+2}^N + i_{n+2}^N)]$. This signal F is obtained by means of the apparatus shown in FIG. 3a as a signal $i_n^N$, which signal belongs to a field which is to be considered as the first field of different groups consisting of pairs of associated fields, each pair forming a picture. During the second field of each group the terminals $i^{N+1}$ are interconnected via the switching devices 30 and 36. When now the video signal source 21 supplies the signal $A = i_{n+3}^{N+1}$, the delay devices 35 and 26 produce the signals $B = i_{n+1}^{N+1}$ and $C = i_{n-1}^{N+1}$ respectively. With respect to the signal $B = i_{n+1}^{N+1}$ which is applied to the delay device 33, its output terminal carries a signal component which belongs to the preceding field N and in this field lies one line lower, that is to say the line numbered n+2. Consequently the signal $D = (i_n^N + i_{n-2}^N)$ of FIG. 3b gives the signal $E = \frac{1}{2}(i_{n+2}^N + i_n^N)$. From the signals A, C and E the stage 28 forms a correction signal $AC/E = \frac{1}{2}(i_{n+2}^N + i_n^N) - \frac{1}{2}(i_{n-1}^{N+1} + i_{n+3}^{N+1})$ so that the stage 35 will deliver a signal $F = i_{n+1}^{N+1'} = i_{n+1}^{N+1} + q [\frac{1}{2}(i_{n+2}^N + i_n^N) - \frac{1}{2}(i_{n-1}^{N+1} + i_{n+3}^{N+1})]$ as shown in FIG. 3b.

The operation of the apparatus shown in FIG. 3a is illustrated by the signals shown in FIG. 4. FIGS. 4a and 4b apply to the cases described with reference to FIGS. 2a and 2b respectively, the signals A1 and A2 of FIG. 2 being identical with the signals A1 and A2 respectively of FIG. 4. It will be seen that the correction signal AC/E1 of FIG. 4a is only slightly different from the correction signal AC1 of FIG. 2a; the difference consists in that the correction signal for the second field (N+1) in each group is reduced to one half. In FIG. 4a the corrected signal F for $p = \frac{1}{2}$, $q = 0$ is designated F11, that for $p = \frac{1}{2}$, $q = \frac{1}{2}$ is F12 and that for $p = \frac{1}{2}$, $q = 1$ is F13. It will be seen that in the example given the signal F1 of FIG. 2a is identical with the signal F13 of FIG. 4a, which means that in the case of the signal A1, that is to say in the absence of motion, the picture quality is not affected by the operation of the apparatus shown in FIG. 3a.

The correction signal AC/E2 of FIG. 4b is greatly different from the signal AC2 shown in FIG. 2b. For $p = \frac{1}{2}$ and $q = 0, \frac{1}{2}$ or 1, FIG. 4b shows corrected signals F21, F22 and F23 respectively. A comparison of the signal F2 shown in FIG. 2b which on display gives troublesome flicker, with the signal F23 of FIG. 4b clearly shows that now there is no question of a flicker phenomenon on display while the transitions in the information samples are effected gradually. The degree of correction may be varied at will be making the factors $p$ and $q$ of the stages 37 and 38 respectively adjustable.

It is found that a flicker-free display of a stop-motion television picture is obtainable by dividing the video information supplied serially by the video signal source 21 into groups which each comprise two associated fields (N, N+1), and by performing a signal combination before recording on a video record (1 in FIG. 1a) in the device 20 of FIG. 3a. The picture synchronizing signal which appears at the output terminal $24_2$ ensures that for a given choice of groups, for example a choice such that the semicircles 4 and 5 or the semicircles 5 and 6 of the video disc 1 shown in FIG. 1a form a group of two fields, further group formation of the subsequent fields continues correspondingly. In other words, the picture synchronizing signal at the terminal $24_2$ of FIG. 3a corresponds to a mark on the video disc 1 shown in FIG. 1a which on display of a stop-motion picture serves as the starting mark thereof. This starting mark on the video disc 1 may, for example, be realized in any one of three ways.

a. By making a mark, for example at the circumference of the video disc 1, so that depending on the location of the mark either the semicircles 4 and 5 or the semicircles 5 and 6 and corresponding semicircles provide the information for a picture. b. By slightly modifying for each pair of fields the field synchronizing information which according to the relevant standard is contained in the first lines of each field, said modification serving as picture synchronizing information and being detectable for this purpose.

c. By arranging for all pictures to begin with the fields which commence with a full line of information (line 7 of the semicircle 4 of the video disc 1 shown in FIG. 1a) or those which begin with a half line of information (line 10 of the semicircle 5). According to this rule a display device for the video record 1 must be constructed so that when the user opts for display of a stop-motion picture during a continuous display, it is not simply the first field after this option together with the next field that are selected for this stop-motion picture: instead a field is waited for which is detected to be the first field of a group according to the rule.

Figure 5A:
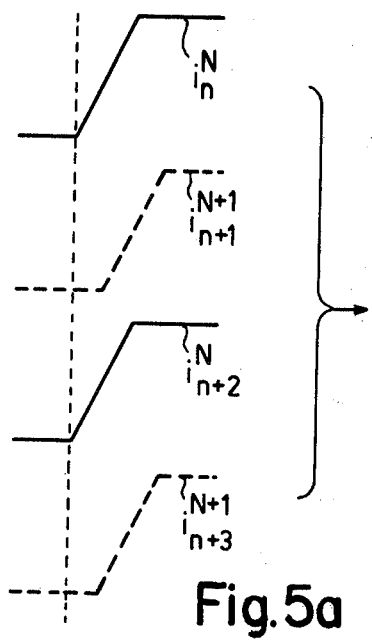

FIG. 4, in particular FIG. 4b including the signal F23, shows that a shift in the field scanning direction will no longer cause any flicker phenomena. The apparatus shown in FIG. 3a is operative also for shifts in the line scanning direction, as will be illustrated with reference to FIG. 5. FIG. 5a shows a signal transition in the line scanning direction for the line information samples $i_n^N$ and $i_{n+2}^N$ in a given field and for the line information samples $i_{n+1}^{N+1}$ and $i_{n+3}^{N+1}$ in the next field. In the display illustrated by FIG. 5b the line information samples $i_n^N$, $i_{n-2}^N$ etc. occur at the same location, while the line information samples $i_{n+1}^{N+1}$, $i_{n+3}^{N+1}$ and $i_{n-1}^{N+1}$ etc. occur at a shifted location, as shown also in FIG. 1c.

Figure 5B:
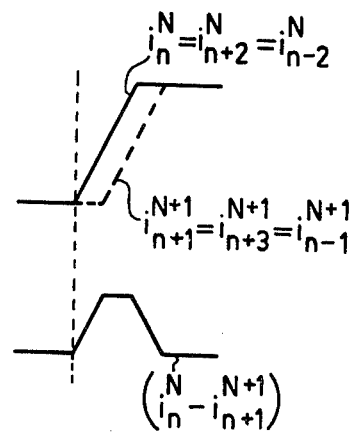
Figure 5C:
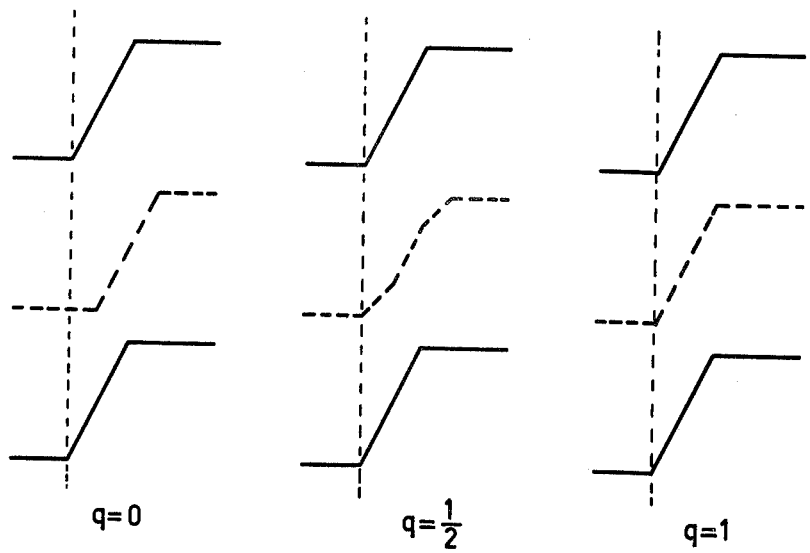

The signals of FIG. 3b show that during the first field (N) the signal AC/E is equal to zero, so that the signal F is $i_n^N = i_n^N$. For the second field (N+1) the signal AC/E is equal to $(i_n^N - i_{n+1}^{N+1})$, which signal is shown in FIG. 5b, while the signal F is $i_{n+1}^{N+1'} = i_{n+1}^{N+1} + q(i_n^N - i_{n+1}^{N+1})$. In FIG. 5c the signals $i_n^N$ and $i_{n+1}^{N+1'}$ are shown for q is 0, ½ and 1. It will be seen that for q = 1 an ideal correction is obtained and that for q = ½ there is a considerable improvement as compared with q = 0.

Figures 6A, 6B:
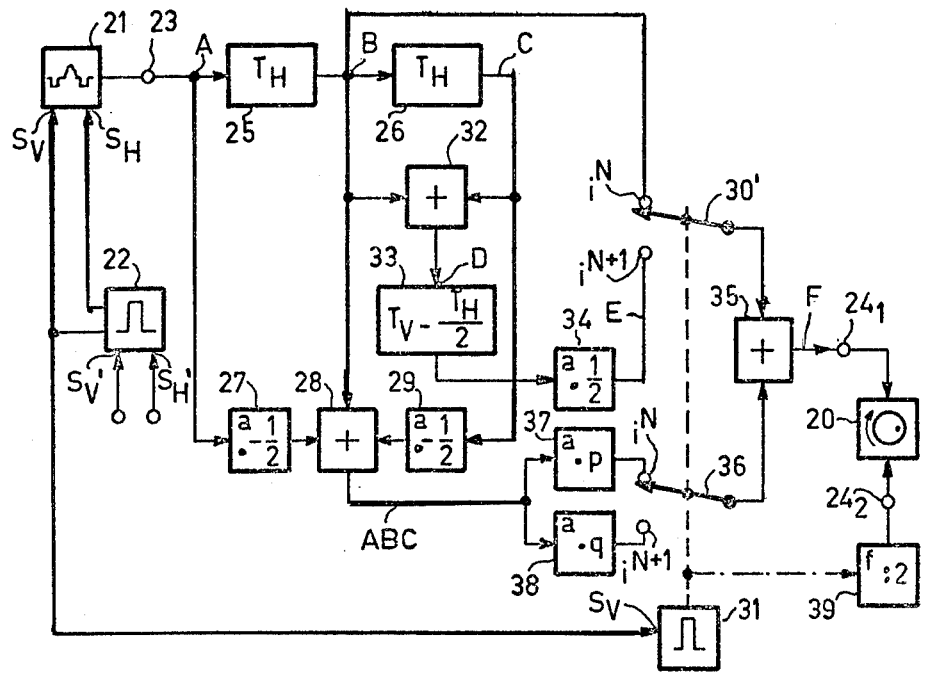

FIG. 6a shows a second embodiment of an apparatus according to the invention the operation of which is illustrated by instantaneous information samples $i$ shown in FIG. 6b. The apparatus shown in FIG. 6a differs from that shown in FIG. 3a by the location of the switching device 30, which therefore is designated 30' in FIG. 6a. The output terminal of the switching device 30' is connected to an input terminal of the superposition stage 35, while the junction of the two delay devices 25 and 26 is directly connected to an input terminal of the superposition stage 28. The interchange of the connections results in that the superposition stage 28 delivers a normal vertical aperture correction signal ABC in each field and that for the second field (N+1') a signal which is a combination originating from the first field, i.e. $\frac{1}{2}(i_{n+2}^N + i_n^N)$, is corrected instead of the associated video signal. The result is shown by the signal F of FIG. 6b. It will be seen that for q = 1 the information $i_{n+1}^{N+1'}$ of the signal F shown in FIG. 6b is identical with that shown in FIG. 3b. Consequently the signal F23 of FIG. 4b with p = ½ and q = 1 also applies for the apparatus shown in FIG. 6a.

In the manner described with reference to FIG. 5 for a shift in the line scanning direction it follows for the signal F shown in FIG. 6b that: $i_n^N = i_n^N$ and $i_{n+1}^{N+1'} = \frac{1}{2}(i_{n+2}^N + i_n^N) = i_n^N$ so that ideal correction is achieved irrespective of the factor q.

The embodiments of the apparatus shown in FIGS. 7, 8, 9 and 10 include no vertical aperture correction circuits. Such circuits may, however, be included similarly to horizontal aperture correction circuits, for example, between the output terminal $24_1$ which carries the signal F and the device 20 for making a video record. As far as is possible and meaningful, in the apparatus shown in FIGS. 7, 8, 9 and 10 the same reference numerals are used as in the apparatus shown in FIGS. 3 and 6, which holds for the components 20 to 24, 31 and 39.

Figures 7A, 7B:
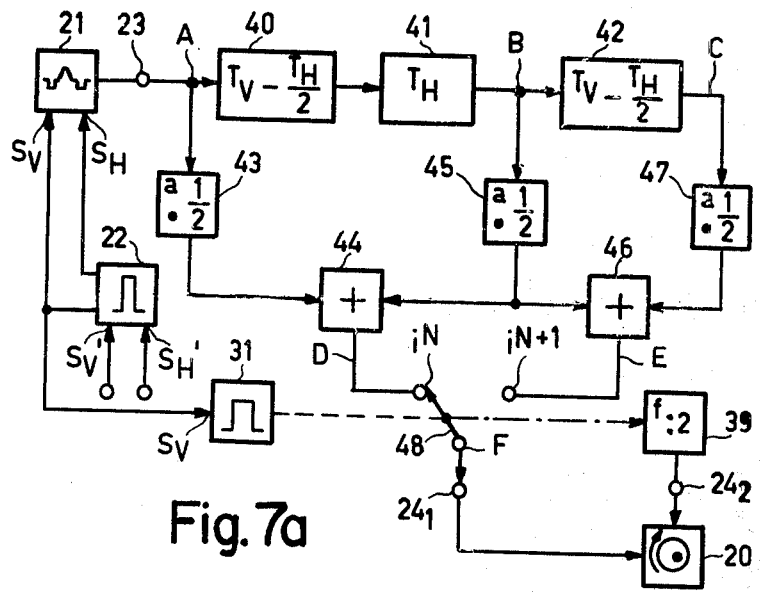

In the apparatus shown in FIG. 7a the input terminal 23 is connected to a series combination of three delay devices 40, 41 and 42, the devices 40 and 42 having a delay time $(T_V - T_H/2)$ substantially equal to a field period $T_V$ while the device 41 has a delay time equal to a line period $T_H$. The delay devices 40 and 41 together have a delay time $(T_V + T_H/2)$ which is also substantially equal to the field period $T_V$. This delay time may alternatively be provided by a single delay device. The input terminal 23 at which a signal A appears is connected via an attenuator 43, having a multiplying factor of ½, to an input terminal of a superposition stage 44. Said stage 44 has a second input terminal which is connected via an attenuator 45, having a multiplying factor of ½, to the junction of the devices 41 and 42, which junction carriers a signal B. The output terminal of the attenuator 45 is also connected to an input terminal of a superposition stage 46 which is connected via an attenuator 47, having a multiplying factor of ½, to the output terminal of the device 42 at which a signal C appears. The output terminal of the stage 44, at which a signal D appears, and the output terminal of the stage 46, at which a signal E appears, are connected to input terminals $i^N$ and $i^{N+1}$ respectively of a switching device 48. The output terminal of device 48 is connected to the output terminal $24_1$ of the apparatus at which a signal F appears.

It is assumed that when the input terminal $i^N$ of the switching device 48 is connected to its output terminal a signal $A = i_n^N$ shown in FIG. 7b appears at the input terminal 23 of the apparatus. After the delay device 40 a signal $i_{n+1}^{N-1}$ occurs, and after the delay device 41 the signal $B = i_{n-1}^{N-1}$ is obtained. The signals A and B are combined in the superposition stage 44 to form the signal $D = \frac{1}{2}(i_n^N + i_{n-1}^{N-1})$, which gives the signal $F = i_n^N$. In the subsequent field period the apparatus operates via the input terminal $i^{N+1}$ of the switching device 48. When the signal $B = i_n^N$ occurs, the signal $C = i_{n+1}^{N-1}$ is obtained after the delay device 42, which via the superposition stage 46 results in the signal $E = \frac{1}{2}(i_n^N + i_{n+1}^{N-1})$ which ultimately is equal to the signal $F = i_{n+1}^{N+1'}$.

Thus the information of two associated fields which form a group is constituted for a given line (n) of the first field $(i_n^N)$ by the respective video signal $(i_n^N)$ and by a superjacent line (n−1) from a video signal of the preceding field $(i_{n-1}^{N-1})$, which signal is delayed substantially by a field period $T_V$. For the subsequent line (n+1) of the second field $(i_{n+1}^{N+1'})$ the information is given by the video signal of the first field $(i_n^N)$, which video signal is delayed substantially by a field period $T_V$, and by a subjacent line (n+1) from the video signal of the said preceding field $(i_{n+1}^{N-1})$, which video signal is delayed substantially by two field periods $T_V$.

Figure 11A:
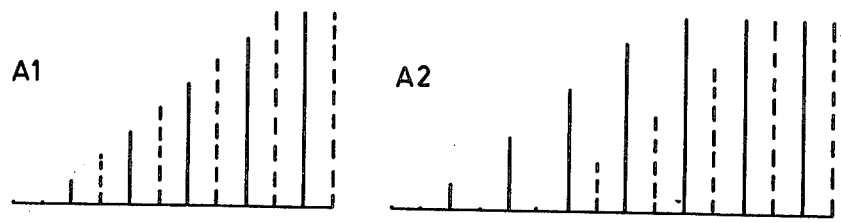
FIG. 11 shows amplitude versus time diagrams of output signals which occur in the apparatus of FIGS. 7 to 10 and FIGS. 12 and 13 show apparatus for carrying the procedure into effect for colour television.
Figure 11B:
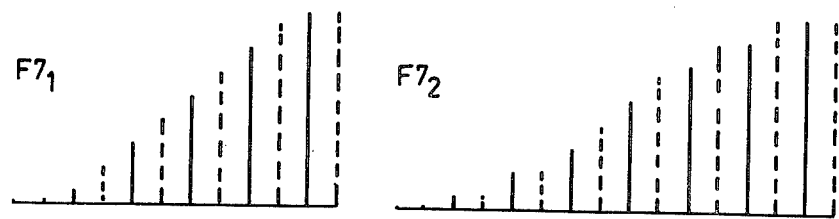

The result of the signal combination is shown in FIG. 11b by signals $F7_1$ and $F7_2$ which are derived from the signals A1 and A2 respectively which were described hereinbefore with reference to FIGS. 2 and 4 and which are shown again in FIG. 11a. It is found that during display of the signal $F7_2$ no flicker occurs. With respect to calculating the signal values of the signal $F7_2$ shown in FIG. 11b and of the corresponding signals shown in FIGS. 11c, 11d and 11e it is assumed that the information $i^{N-1}$ is equal to the information $i^{N+1}$.

The use of the delay device 41 having a delay time equal to the line period $T_H$ results in the line information of the two associated fields comprising a line and the superjacent line for the first field, and the same line and the subjacent line for the second field. In the absence of the delay device 41 the signal B shown in FIG. 7b would be equal to $i_{n+1}^{N-1}$, which would give a signal F equal to $i_n^N = \frac{1}{2}(i_n^N + i_{n+1}^{N-1})$. From the signal F shown in FIG. 7b it follows that in this case the line information for the first field and that for the second field of the group are identical. Compared with the gradually ascending slope produced by the information samples of the signals $F7_1$ and $F7_2$ shown in FIG. 11, a picture of lower quality will then be obtained owing to the fact that the staircase nature of the slope would give rise in display to a striped pattern with stripes in the horizontal direction.

Figures 8A, 8B:
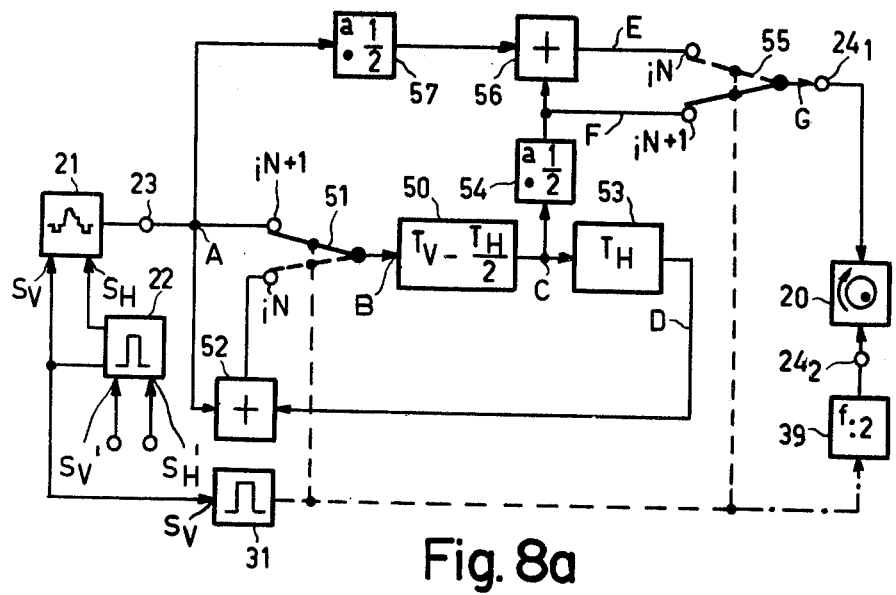

FIG. 8a shows an apparatus largely comparable to that shown in FIG. 7a, with the difference that only one delay device 50 is used which has a delay time ($T_V - T_H/2$) which is substantially equal to a field period $T_V$. The delay device 50 is of a type capable of simultaneously receiving a signal and delivering a delayed signal. The input terminal of the delay device 50, to which a signal B is applied, is connected to the output terminal of a switching device 51 having an input terminal $i^{N+1}$ which is connected to the input terminal 23 of the apparatus to which the signal A is applied. An input terminal $i^N$ of the switching device 51 is connected to an output terminal of a superposition stage 52 which has an input terminal connected to the terminal 23 and an input terminal which, via a delay device 53 having a delay time equal to a line period $T_H$, is connected to the output terminal of the delay device 50. The junction of the delay devices 50 and 53, carries a signal C which, after the device 53, results in a signal D. This junction is connected via an attenuator 54 to an input terminal $i^{N+1}$ of a switching device 55 and to an input terminal of a superposition stage 56. A second input terminal of the superposition stage 56 is connected via an attenuator 57 to the input terminal 23. The output terminal of the stage 56 is connected to an input terminal $i^N$ of the switching device 55 the output terminal of which is connected to the output terminal $24_1$ of the apparatus.

Depending upon the switch position a signal E applied to the input terminal $i^N$ or a signal F applied to the input terminal $i^{N+1}$ of the switching device 55 results in a signal G.

In FIG. 8b the information sample $i$ is shown which occurs at the instants corresponding to the two switch positions of the switching devices 51 and 55, which positions are indicated by a solid line ($i^{N+1}$) or a dotted line ($i^N$). The explanation commences with a starting phenomenon, the apparatus operating via the input terminal $i^{N+1}$, in which case the signal B is equal to the signal $A = i_{n+1}^{N-1}$. In the next field period $i^N$ the signal $A = i_n^N$ is applied to the input terminal 23, in which case the signal $C = i_{n+1}^{N-1}$ is produced at the output terminal of the delay device 50 while the signal $D = i_{n-1}^{N-1}$ is produced at the output terminal of the delay device 53. From the signals A and D the superposition stage 52 forms the signal $B = i_n^N + i_{n-1}^{N-1}$ to be supplied to the delay device 50. From the signals A and C the superposition stage 56 forms the signal $E = \frac{1}{2}(i_n^N + i_{n+1}^{N-1})$ which provides the output signal $G = i_n^N$.

In the next field period, during which the apparatus is operating via the input terminals $i^{N+1}$, the signal $A = i_{n+1}^{N+1}$ appears and results in the signal B. When the signal $A = i_{n+1}^{N+1}$ is applied to the input terminal of the delay device 50, the signal C at the output terminal of this device contains a signal component $i_{n+2}^N$. This signal component is supplied by the signal component $i_n^N$ in the signal $B = i_n^N + i_{n-1}^{N-1}$ of the preceding field. As a result; the delay device 50 delivers the signal $C = i_{n+2}^N + i_{n+1}^{N-1}$ which when divided by two gives the signal F, so that the output terminal $24_1$ supplies the signal $G = i_{n+1}^{N+1'}$ shown in FIG. 8b produced.

Figure 11C:

FIG. 11c shows the output signals $G8_1$ and $G8_2$ of the apparatus shown in FIG. 8a obtained from the input signals A1 and A2 shown in FIG. 11a. From the signal G shown in FIG. 8b it follows that the information for a given line ($n$) in the first field (N') of the group of two associated fields is composed of the information from this line itself and the information from a subjacent line ($n+1$) of the preceding field (N−1), while the information of the next line ($n+1$) in the second field (N+1') is composed of the information from the said subjacent line ($n+1$) of the said preceding field (N−1) and the information from the line adjacent thereto ($n+2$) of the field which corresponds to the first field (N) of the group.

The use of the delay device 53 having a delay time equal to the line period $T_H$ ensures that for the formation of the line information of the first and second fields of the group a common line (N+1) is used in conjunction with the superjacent line ($n$) for the first field and with the subjacent line ($n+2$) for the second field. As has been set out in the explanation of the use of the delay device 41 in the apparatus shown in FIG. 7a, this results in the signals $G8_1$ and $G8_2$ of FIG. 11c being given the desired gradually ascending slopes for the information samples.

Absence of the delay device 53 would result in that instead of the signal component $i_{n-1}^{N-1}$ in the signal $B = i_n^N + i_{n-1}^{N-1}$ shown in FIG. 8b a signal component $i_{n+1}^{N-1}$ would occur (which is derived from the signal C) and hence the signal F would become $i_{n+1}^{N+1'} = \frac{1}{2}(i_{n+2}^N + i_{n+3}^{N-1})$. As a result, for the formation of the line information of the first and second fields of the group four consecutive lines, one pair alternating with the other pair, would be used, and this would give, instead of the gradually ascending slope of the information samples, the undesirable staircase-shaped slope with the resulting striped pattern in the picture displayed.

Figures 9A, 9B:
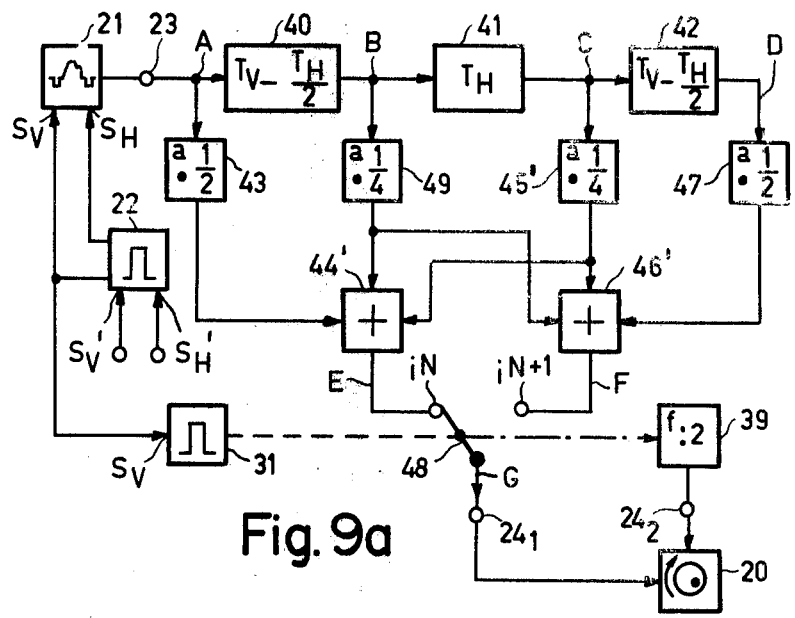
Figure 11D:
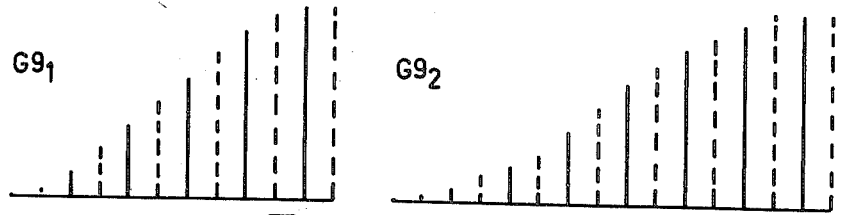
Figure 11E:
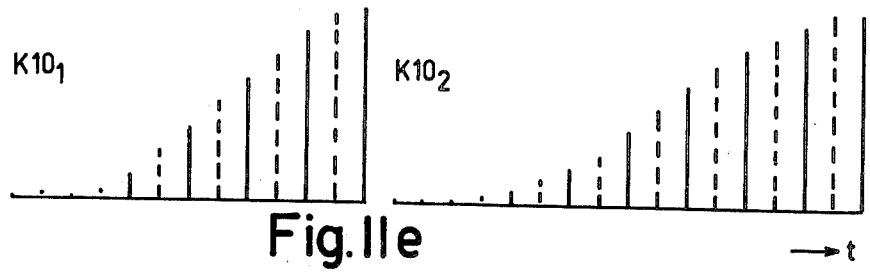

FIG. 9a shows an apparatus which, in addition to the components described with reference to the apparatus shown in FIG. 7a, comprises an attenuator 49, having a multiplying factor $\frac{1}{4}$, which attenuator is connected to the junction of the delay devices 40 and 41. The output of the attenuator 49 is connected to third input terminals of the superposition stages 44' and 46', and furthermore the attenuator 45' has a multiplying factor of $\frac{1}{4}$ instead of $\frac{1}{2}$. In the same manner as the signals A to F are shown in FIG. 7b signals A to G which occur in the apparatus of FIG. 9a are shown in FIG. 9b. FIG. 11d shows diagrammatically the output signals $G9_1$ and $G9_2$ which are produced by the apparatus of FIG. 9a from the input signals A1 and A2 respectively of FIG. 11a. From the signal G shown in FIG. 9b it follows that the information for a given line ($n$) from the first field (N') of a group of two associated fields is formed from the video signal of the relevant line ($i_n^N$) and from a video signal from the preceding field ($n-1$), which signal is delayed substantially by a field period, whilst for obtaining the information from a subjacent line ($n+1$) and a superjacent line ($n-1$) the delay is reduced and increased respectively by one line period. The information for the line ($n+1$) of the second field (N+1') of the group is formed from the video signal of the said preceding field (N−1), which signal is delayed by substantially two field periods, and from the video signal of the first field (N), which signal is delayed by substantially one field period, while in order to obtain the information of a subjacent line ($n+2$) and of a superjacent line ($n$) the delay is reduced and increased respectively by one line period.

Figures 10A, 10B:
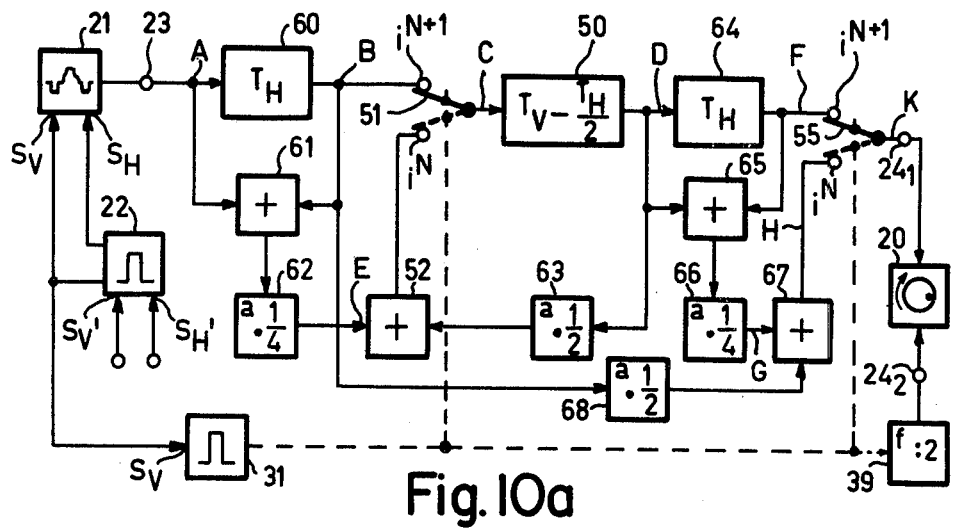

FIG. 10a shows an apparatus which in some respects corresponds to that shown in FIG. 8a, in particular in the use of the delay device 50 which is suitable for simultaneously receiving a signal C and delivering a signal D delayed by substantially a field period, and in the use of the switching devices 51 and 55 the superposition stage 52. In addition a delay device 60 having a delay time equal to one line period $T_H$ and a parallel-connected superposition stage 61 are provided between the input terminal 23 of the apparatus and the input terminal $i^{N+1}$ of the switching device 51 which terminal carries a signal B. The output terminal of the stage 61 is connected via an attenuator 62, having a multiplying factor of ¼, to an input terminal of the stage 52, which terminal carries a signal E. Another input terminal of this stage 52 is connected, via a signal amplitude multiplier stage 63, having a multiplying factor of ½, to the output terminal of the delay device 50. The output terminal of the delay device 50 is also connected to the parallel combination of a delay device 64 and a superposition stage 65, which parallel combination is connected to an input terminal $i^{N+1}$ of the switching device 55, which terminal carries a signal F. The output terminal of the stage 65, at which a terminal signal G appears, is connected via an attenuator 66, having a multiplying factor of ¼, to an input terminal of a superposition stage 67. The other input terminal of stage 67 is connected via an attenuator 68, having a multiplying factor of ½, to the output terminal of the delay device 60. The output terminal of the stage 67, at which terminal a signal H appears, is connected to the input terminal $i^N$ of the switch 55. The output terminal of switch 55 carries a signal K and is connected to the output terminal $24_1$ of the apparatus.

FIG. 10b lists the information samples i in the same manner as is used in FIG. 8b. After a starting period in which the signals $A = i_{n+1}^{N-1}$ and $B=C=i_{n-1}^{N-1}$ occur, in the next period in which the signals $A = i_n^N$, $B = i_{n-2}^N$ and in addition the signals $D = i_{n-1}^{N-1}$ and $F = i_{n-3}^{N-1}$, which produce the signal $G = \frac{1}{4}i_{n-1}^{N-1} + \frac{1}{4}i_{n-3}^{N-1}$, occur, the output signal is $K=H=i_n$ as shown in FIG. 10b. During this field period the signal $C = \frac{1}{2}i_{n-1}^{N-1} + \frac{1}{4}i_n^N + \frac{1}{4}i_{n-2}^N$ is applied to the delay device 50. In the next field period, with the signals $A = i_{n+1}^{N+1}$ and $B = i_{n-1}^{N+1}$, in the manner described with reference to FIG. 8b the delayed signal C occurs as the signal $D = \frac{1}{2}i_{n+1}^{N-1} + \frac{1}{4}i_{n+2}^N + \frac{1}{4}i_n^N$ with which the signal $F = \frac{1}{2}i_{n-1}^{N-1} + \frac{1}{4}i_n^N + \frac{1}{4}i_{n-2}^N$ is associtaed, which results in the signal $K=F=i_{n+1}^{N+1'}$ at the output terminal $24_1$.

The signal K of FIG. 10b is shown in FIG. 11c by the signals $K10_1$ and $K10_2$, starting from the input signals A1 and A2 respectively of FIG. 11a. It will be seen that the information sample i associated with the lines of the said first (N') and second (N+1') fields is shifted by two consecutive lines relative to the fields (N and N−1 respectively) used for combining the signals. This shift has no disadvantages and is acceptable. The signal K of FIG. 10b differs from the signal G of FIG. 9b only in that the shift comprises two consecutive lines (n−2 with respect to n; n−1 with respect to n+1; etc.).

The apparatus shown in FIGS. 7, 8, 9 and 10 do not include a vertical aperture correction circuit. Such a circuit may, however, be used and then may be inserted between the output terminal $24_1$ and the device 20. Similarly a horizontal aperture correction circuit may be provided.

It should further be mentioned that inexpensive delay devices having delay times of substantially a field period may be used which have only a limited frequency pass band. This can be made possible by arranging that a signal A limited in frequency is applied to the input terminal 23 and the output terminal $24_1$ is connected to one of two input terminals of a superposition stage; its other input terminal is fed, by a circuit bypassing the apparatus $23-24_1$ of the invention and carrying the high-frequency signal component.

FIG. 5 illustrates how the apparatus shown in FIG. 3a eliminates the flicker phenomenon which occurs during display owing to motion in the televised scene in the line scan direction, i.e. the horizontal direction. From this it follows for the apparatus shown in FIG. 7a having the output signal F of FIG. 7b that, as $i_{n-1}^{N-1} = i_{n+1}^{N-1}$ for the line scan direction, in both fields (N' and N+1') the same mean value of the shifted slopes is obtained in the fields (N and N−1). The same applies to the apparatus and the signals shown in FIGS. 8, 9 and 10.

A video record or disc containing information recorded by means of a method according to the invention has the information arranged in the field groups. In each group the information of the first field differs only slightly from that in the second field and motion in the scene which involves differences in video information between consecutive fields can occur only as differences in video information between groups which each consist of two associated fields.

In the preceding description, solutions have been given in which use is made of at least one delay device having a delay time of substantially a field period $T_V$. In additional solution is possible which employs a delay device having a delay time of a frame period which is equal to two field periods $T_V$. A signal for the first field of either group of two fields can be formed according to the equation $i_n^{N'} = (i_n^{N-2} + i_n^N)/2$ while the signal for the second field is formed according to the equation $i_{n+1}^{N+1'} = i_{n+1}^{N-1}$. In words this can be expressed as follows: the information for the first field ($i^{N'}$) is formed as the average of the information ($i^N$) which is supplied direct and the information ($i^{N-2}$) which is delayed by one frame period; the information for the second field ($i^{N+1'}$) is supplied by the information ($i^{N-1}$) which is delayed by one frame period. For a moving part in a scene, this has the advantage that, since the signals of a first and a third frame are averaged, the (average) position of the part is the same as that of the second raster. In the absence of motion the signal processing does not affect in any way the signals which were originally supplied.

For completeness it should be noted that the signal processing may be performed by means of a device which has an input terminal connected directly and via a delay device having a delay time of one frame period to an adder stage, the output of the adder stage being connected via an attenuator having a factor of ½ and the output of the delay device being connected direct to input terminals of a switch-over device, the output terminal of which is connected to the output of the device. During the first field of each group of two associated fields the attenuator is connected to the output, while during each second field the output of the delay device is connected direct to the output of the device.

The preceding description describes in a general sense the processing of a video signal occurring in a black-white television system. The following describes in particular the application of the method to a video signal produced in a colour television system. It is inefficient to carry out the signal processing separately for each of the three color video signals which normally occur in color television, which signals correspond to red, green and blue partial pictures.

Figure 12:
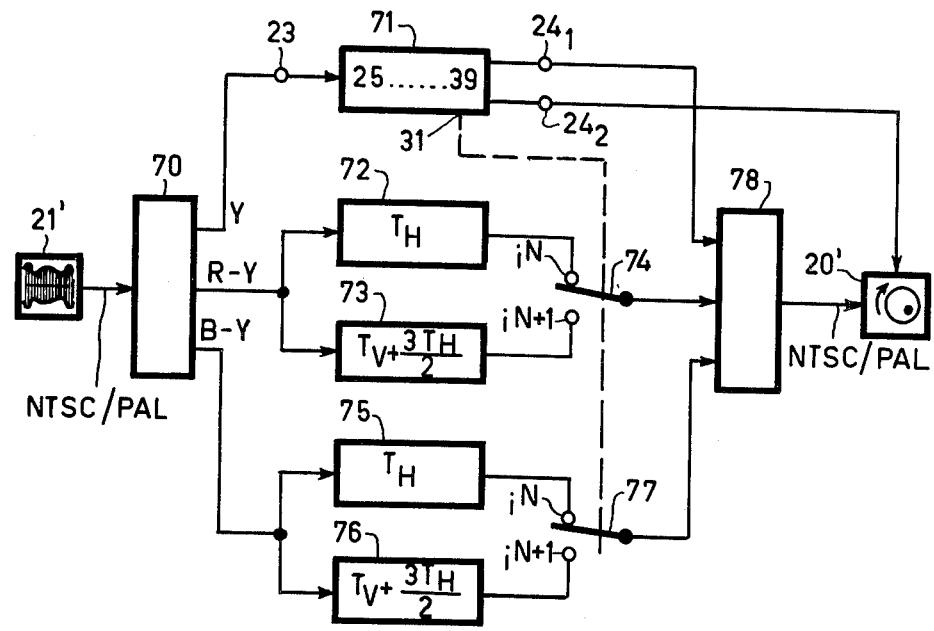

In the device according to FIG. 12 a video signal source 21' supplies a coded color television signal which, depending on the color television system used, is for example a standard NTSC or PAL signal. The NTSC/PAL signal is supplied to a decoder circuit 70 which supplies a luminance signal Y and two color-difference signals R-Y and B-Y respectively to three circuit outputs. Starting from the color television system based on the three primary colors, red, green and blue to which color signals R, G and B correspond respectively, it follows that the luminance signal is formed as the signal combination Y = 0.30 R + 0.59 G + 0.11 B.

The circuit output of the decoder circuit 70 with the luminance signal Y is connected to an input terminal 23 of a device 71. The device 71 comprises the components 25 ... 39 which are given in FIGS. 3a and 6a. The device 71 is likewise provided with first and second output terminals $24_1$ and $24_2$ at which are available respectively a video signal combination in separate groups of two associated fields each (signal F of FIG. 3b or 6b) and a picture synchronizing signal. The output terminal $24_2$ with the picture synchronizing signal is connected to an input of a device 20' for providing information on a video record or disc. In addition, the device 71 of FIG. 12 is provided with an output for supplying a switching signal, the output of the switching signal generator 31 of the device according to FIG. 3a or 6a is used for this switching signal.

In the device according to FIG. 12 the output of the decoder circuit 70 with the color-difference signal R-Y is connected to an input of a delay device 72 having a delay time equal to a line period $T_H$ and to an input of a delay device 73 having a delay time $T_V + 3/2\ T_H$, where $T_V$ is equal to a field period. The output of the delay device 72 is connected to an input terminal $i^N$ of a switch-over device 74 which is connected by means of an additional input terminal $i^{N+1}$ to the output of the delay device 73. For control purposes the switch-over device 74 is connected to the device 71 (to the output of the switching signal generator 31 present therein) so that in the first field of either group of two fields the input terminal $i^N$ is interconnected and in the second field the input terminal $i^{N+1}$. In the same way the output of the decoder circuit 70 with the color-difference signal B-Y is connected to delay devices 75 and 76 respectively having delay times of $T_H$ and $T_V + 3/2\ T_H$ respectively, these being followed by a switch-over device 77. The output terminals of the switch-over devices 74 and 77 (which, together, constitute a double switch-over device (74,77) and the output terminal $24_1$ of the device 71 are connected to inputs of an encoder circuit 78 for providing a standard NTSC or PAL signal which becomes available at an output for supply to the device 20' for recording information on a video record or disc.

For an explanation of the operation of the device 71 of FIG. 12, reference is made to FIGS. 3 and 6 and the relevant description. Constructing the device 71 as one of the devices given in FIGS. 7, 8, 9 and 10 is considered to be less suitable as the signal combination produced at the output $24_1$ are formed direct from more or less uncorrelated video signals of various fields and lines therein. On the other hand, in the case of the device according to FIG. 3 a modified aperture correction signal for modifying the information of the second field in either group is used, which has been formed from information from the first field. The construction of the device 71 according to FIG. 6 is considered the most suitable, for in this construction the two fields of either group have the whole aperture correction signal whilst the main signal of the second field $(i_{N+2}{}^N + i_n{}^N/2)$ is strongly correlated to that of the first field $(i_n{}^N)$ as appears from the signal F of FIG. 6b. For this reason reference is made hereinafter to FIG. 6 for the construction and the operation of the device 71 of FIG. 12.

The device 71 of FIG. 12 supplies to the output terminal $24_1$ the signal F of FIG. 6b where $i=Y$ so that in the first field of each group a signal $y_n{}^N$ and in the second field a signal $Y_{n+1}{}^{N+1'}$ becomes available. During the first field the signal A of FIG. 6b appears at the input terminal 23 of FIG. 12 which results in $Y_{n+2}{}^N$. With respect to the signal at the output terminal $24_1$ the device 71 has a delay time of a line period $T_H$ which follows from the application of the delay device 25 of the device according to FIG. 6a. At the inputs of the delay devices 72 and 73 the signal $(R-Y)_{n+2}{}^N$ appears and at those of the delay devices 75 and 76 a signal $(B-Y)_{n+2}{}^N$. As a result during the first field (N) signals $(R-Y)_n{}^N$ and $(B-Y)_n{}^N$ are found at the outputs of the delay devices 72 and 75 respectively. In the encoder circuit 78 the signals $Y_n{}^N$, $(R-Y)_n{}^N$ and $(B-Y)_n{}^N$ are formed into a standard NTSC or PAL signal. It is clear that only the luminance information is modified for carrying out picture frequency flicker compensation for a stop-motion picture, while the color information remains unchanged.

During the second field (N+1) of each two-field group the signal $Y_{n+1}{}^{N+1'}$ appears at the output terminal $24_1$ of the device 71 while the signal $Y_{n+3}{}^{N+1}$ appears at the input terminal 23 (as follows from the signals F and A of FIG. 6b). At the inputs of the delay devices 72 and 73 or 75 and 76 respectively the signals $(R-Y)_{n+3}{}^{N+1}$ $(B-Y)_{n+3}{}^{N+1}$ appear. The delay time $T_V + 3/2\ T_H$ of the delay devices 73 and 76 results in their output signals being delayed by a field period $T_V$ and $1\frac{1}{2}$ line periods $T_H$, which produces $(R-Y)_n{}^N$ and $(B-Y)_n{}^N$. A delay time $T_V + \frac{1}{2}T_H$ yields the signals $(R-Y)_{n+2}{}^N$ and $(B-Y)_{n+2}{}^N$ while the extra delay time $T_H$ results in a signal $(R-Y)_n{}^N + (B-Y)_n{}^N$.

For the encoder circuit 78 the signals $Y_{n+1}{}^{N+1'}$ $(R-Y)_n{}^N$ and $(B-Y)_n{}^N$ become available for the second field of each group of two fields. As $Y_n{}^N$ $(R-Y)_n{}^N$ and $(B-Y)_n{}^N$ become available for the first field it follows that for a luminance information which is modified by combining signals in the groups of two field periods each, the color information given in the form of color-difference signals is the same in both field periods, whilst effective ellimination of the flicker phenomenon at the frame frequency occurs in the display of a stop-motion picture. An advantage is that the delay devices 72, 73, 75 and 76 and in particular the delay devices 73 and 76 having a delay time of more than one field period $T_V$, need only have a band-width of approximately 1 MHz for processing the color-difference signals (R−Y) and (B−Y) which are limited in frequency to 0.6 to 0.8 MHz. As for the device 71, the delay devices provided therein (of FIG. 6a the delay devices 25, 26 having the time delay $T_H$ and 33 having the time delay $T_V - \frac{1}{2}T_H$ must have a band-width of approximately 5MHz so that especially the delay device 33 is an expensive component. Processing the three color signals R, G and B, each having the full band-width and each being separately compensated for the flicker phenomenon results in a very disadvantageous solution due to triple application of the device 71. It is more advantageous to first form the luminance signal Y with the full band-width and the frequency-limited color difference signals R−Y and B−Y (direct) from the color signals R, G and B by means of a matrix circuit and thereafter to apply the circuit according to FIG. 12 having the components 71 to 78.

The delay devices 72 and 75 can be dispensed with, in which case the delay devices 73 and 76 should be changed to a delay time $T_V + \frac{1}{2}T_H$. The result is that at the interconnected input terminals $i^N$ the color-difference signals $(R-Y)_{n+2}^N$ and $(B-Y)_{n+2}^N$ are supplied to the encoder circuit 78 when the modified luminance signal $Y_n^N$ is applied. At the interconnected input terminals $i^{N+1}$ the signals $Y_{n+1}^{N+1'}$, $(R-Y)_{n+2}^N$ and $(B-Y)_{n+2}^N$ are supplied to the encoder circuit 78. The shift in the color information which has been taken from the line n+2 instead of from the line n has in practice no perceptible consequences for the display.

Figure 13:
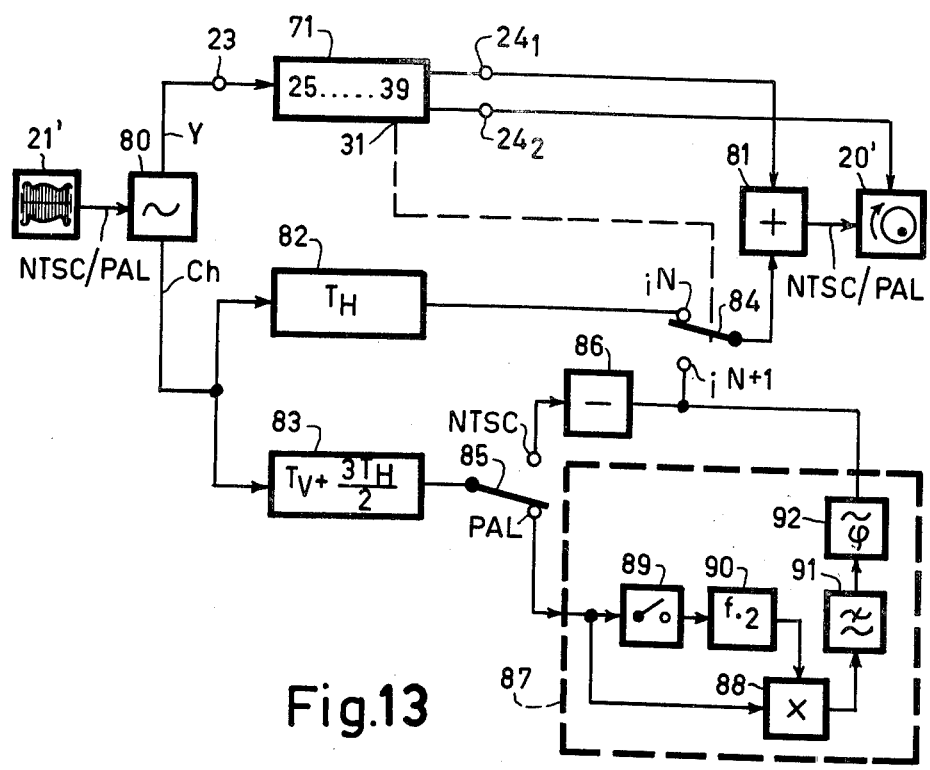

FIG. 13 shows an embodiment of a device according to the invention in which the coded NTSC or PAL color television signal derived from the video signal source 21′ is supplied to a filter circuit 80 which supplies to one output the luminance signal Y (having a band-width of, for example, 3.5 MHz) and to another output the modulated chrominance signal Ch having a limited band-width of 1.5 MHz. The chrominance signal Ch comprises the color information on a quadraturemodulated auxiliary carrier.

The luminance signal Y is processed in the device 71 in the manner described for the device of FIG. 12. The first output terminal $24_1$ is connected to an input of an adder stage 81. The chrominance signal Ch is supplied to two delay devices 82 and 83 which have delay times respectively of the period $T_H$ and a time $T_V + 3/2\, T_H$ which is substantially equal to a field period $T_V$. The output of the delay device 82 is connected to an input terminal $i^N$ of a switch-over device 84, which, under the control of a switching signal (31) derived from the device 71, switches over once per field period. The output of the delay device 83 is connected to an input terminal of, for example, a manual switch 85 having two output terminals. For using the device according to FIG. 13 in a color television system having the NTSC standard, an interconnected output terminal is correspondingly designated and connected via an inverter circuit 86 to the input terminal $i^{N+1}$ of switch-over device 84. For use according to the PAL standard, a correspondingly designated output terminal of the switch 85 is connected to the input via terminal $i^{N+1}$ of the switch-over device 84 via a phase shifting circuit 87. The output of the stage 81 delivers an NTSC or PAL signal to the device 20′.

In the manner described for FIG. 12 and with reference to FIG. 6 it follows that for the first field (N) of each group of two associated fields the signal $Y_n^N$ is produced at the output terminal $24_1$ when the signal $Y_{n+2}^N$ is produced at the input terminal 23. Similarly when the signal $Ch_{n+2}^N$ is applied at the input of the delay device 82, the output of device 82 is the signal $Ch_n^N$. Consequently the output of the adder stage 81 carries a signal $Y_n^N + Ch_n^N$ which is available as a standard NTSC or PAL signal for the device 20′ accompanied by luminance information adapted to eliminate the image-frequency flicker phenomenon during a stop-motion picture stage 81 also supplies unchanged color information (Ch).

For the second field of each group of two associated fields it follows with the aid of FIG. 6 that: when the signal $Y_{n+3}^{N+1}$ is produced at the output terminal 23, the signal $Y_{n+1}^{N+1'}$ is produced at the output terminal $24_1$; also, the signal $Ch_{n+3}^{N+1}$ appears at the input of the delay device 83 while the signal $Ch_n^N$ is produced at its output. Apart from a phase shift which might be necessary (which will be explained later and which also depends on the choice of the NTSC or PAL system for the device of FIG. 13) it follows that the output of the superposition stage 81 carries a signal $Y_{n+1}^{N+1'} + Ch_n^N$.

When comparing the signal for the first field (which is equal to $Y^N + Ch^N$) with that for the second field (which is equal to $Y_{n+1}^{N+1'} + Ch_n^N$) it can be seen that the color information remains unchanged with modified luminance information.

In the preceding description, apart from the fact that the circuits 86 and 87 have been mentioned, the phase shifts between the chrominance signals of successive lines in a field which are prescribed by the color television standard, have not been taken into account. It holds for the NTSC standard that for an interlaced picture of 525 lines the color carrier frequency must be 455/2 times the line frequency while for the color carrier synchronization signal (the burst) each line has a phase of 180° in the (R−Y) (B−Y) diagram. Starting from a function for the chrominance signal:

$$Ch = Ch_o \sin 2\pi \times 227.5 \times 1/T_H \times (t - \tau) \quad (1)$$

where $\tau$ = the number of line time delays $T_H$, a phase shift occurs in the chrominance signal with a value of:

$$\sin 2\pi \times 227.5 \times 1/T_H \times \text{number of line time delay} | T_H \quad (2)$$

For the delay device 83 of the device of FIG. 13 it follows that a time delay $T_V + 3/2\, T_H$ gives an effective time delay of $T_V + \frac{1}{2}T_H = 263 T_H$ with respect to the signal at the output terminal $24_1$ of the device 71. For the number of line time delays equal to 263 it follows from Equation (2) that the phase shift amounts to an integral number of times $2\pi$ plus $\pi$, so that compensation of the phase shift of 180° for the chrominance signal is necessary. To this end the NTSC terminal of the switch 85 is connected via inverter 86 to the input terminal $i^{N+1}$ of the switch-over device 84.

The delay device 82 can be dispensed with, in which case the delay device 83′ should be changed to a delay time $T_V + \frac{1}{2}T_H$ and then an effective delay time of $T_V - \frac{1}{2} T_H = 262\, T_H$ occurs. Then it follows from Equation (2) that a phase shift is produced which is equal to an integral number of 2 times $2\pi$ so that no further measures need be taken.

For the PAL standard applied to a 625-line interlaced picture the color wave frequency must be equal to $((1135)/4 + (1)/(625))$ times the line frequency, while the color wave synchronizing signal (the burst) has, (for successive lines in a field) alternating phases of 135°, 225°, 135°, ... etc. In the (R−Y), (B−Y)-diagram the 135° phase coincides with the (R−Y) axis being at 90° and the 225° phase coincides with the (R−Y) axis being at 270°.

For the PAL chrominance signal the following function applies:

$$Ch = Ch_o \sin 2\pi(283,75 + (1/625))(1/T)_H(t - \tau) \quad (3)$$

The phase shift is as follows:

sin $2\pi(283.75 + 1/625)$ $1/T_H$ (number of line time delays $T_H$). For the delay device 83 of the device according to FIG. 13 it follows, that at a time delay $T_V + 3/2\ T_H$ it has an effective time delay of $T_V + \frac{1}{2}T_H = 313T_H$ with respect to the signal at the output terminal $24_1$ of the device 71. From Equation (4) the phase shift is as follows:

sin $2\pi(8813.75 + 0.5)$, so that the phase shift amounts to an integral number of times $2\pi$ and $\frac{1}{4}$ thereof, which results for the chrominance signal in a phase shift of 90°. To compensate the 90° phase shift a phase shift of −90° is given to the chrominance signal with the aid of the phase shifting circuit 87.

For determining the phase of the burst signal and the associated position of the (R−Y)axis in the (R−Y), (B−Y)-diagram the following applies. In the PAL standard it has been laid down that the phase of the burst signal for the first full line of a field deviates from that for the first full line of the next field. This causes groups of four fields to be produced. Thus, starting from a phase of 135° for the first full line in a first field having odd numbered lines, there follows a phase of 225° for the first full line in the next second field having even numbered lines, 225° for the first full line in the third field having odd numbered lines and 135° for the first full line in the fourth field having even numbered lines. In this situation the (R−Y) axis is at 90° or 270° respectively at the burst signal phase of 135° or 225° respectively. The effective time delay of the delay device 83 of FIG. 13 being equal to $T_V + \frac{1}{2}T_H = 313\ T_H$ it follows that a phase change must be made. The information for a full line in a field having, for example, a phase of 225° for the burst signal, is derived by the time delay of 313 line periods $T_H$ from the superjacent line of the preceding field which has a phase of 135° for the burst signal. The phase change means that the chrominance information and the burst information must be reversed with respect to the (B−Y)-axis in the (R−Y), (B−Y)-diagram which is performed by the phase shifting circuit 87.

The phase shifting circuit 87 of FIG. 13 is provided for performing the phase change of the chrominance signal by −90° and for reversing the chrominance information and the carrier synchronization information with respect to the (B−Y) axis. The PAL chrominance signal Ch whose backporch contains the burst signal is fed in the phase shifting circuit 87 to an input of a signal multiplier 88 and to the input of a gate circuit 89 which only passes the burst signal present on the back porch to a frequency doubler 90 whose output is connected to an input of the signal multiplier 88. In the signal multiplier 88 the chrominance signal Ch which occurs according to the function $Ch_o \sin(\omega t + Q)$ is multiplied by 2 sin $2\omega t$, $2\omega$ being twice the angular frequency of the color carrier. For the function $2Ch_o \sin(\omega t + \phi) \sin 2\omega t$ it holds that it is equal to $$Ch_o \cos(\omega t - \phi) - Ch_o(3\omega t + \phi) \quad (5)$$

The signal according to Equation (5) is produced at the output of the signal multiplier 88 which is connected to a low pass filter 91. The output of the low pass filter 91 carries a signal having a function $Ch_o\cos(\omega t - \phi)$ which (with respect to the signal $Ch_o \sin(\omega t + \phi)$ signifies a reversal with respect to the (B−Y) axis in the (R−Y), (B−Y)-diagram.

The output of the low pass filter 91 is connected to the input of a phase shifting filter 92 which results in a phase shift of −90°. The output of the phase shifting filter 92 is connected to the input terminal $i^{N+1}$ of the switch-over device 84 for supplying thereto the phase-shifted PAL chrominance signal Ch.

Refraining from the use of the delay device 82 and the use of a delay device 83' having a delay time $T_V + \frac{1}{2}T_H$ results in the following. The effective delay time of $T_V - \frac{1}{2}T_H = 312\ T_H$ results in the information for a line in a field being derived from the bottom line of the preceding field. Thus, from the description of the groups of four fields in the PAL standard, it follows that the phase of the burst signal and of the (R−Y) axis need not be changed. From Equation (4) it follows that the chrominance information undergoes a phase shift of sin $2\pi(88530 + 0.5)$ so that there is a phase shift of an integral number of times $2\pi$ and $\pi$. For compensating the 180° phase shift an inverter circuit may be used as a phase shifting circuit.

What is claimed is:

1. A method for manufacturing a video record containing video information provided in circular tracks and intended for reproduction by a television display apparatus, said video information to be recorded occurring in field periods and line periods, two successive field periods comprising an interlaced picture in the display device, said display apparatus being capable of selectively displaying more than two successive field periods for producing a television picture containing motion and for repeatedly displaying two sequentially recorded field periods for obtaining a stop-motion television picture, said method comprising dividing said video information to be recorded in groups of two consecutive fields, phase delaying at least one of said two consecutive fields by at least one horizontal line period, combining as a first combined signal the video information directly from a first of said two consecutive fields with the phase delayed video information from one of said two consecutive fields to be recorded, recording said first combined signal on a semi-circular portion of a first track of said record, combining as a second combined signal the second of said two consecutive fields to be recorded with the phase delayed information from one of said two consecutive fields to be recorded, and recording said second combined signal in the unrecorded semicircular portion of said first track, at least one of said first and second combined signals being a combination of both of said first and second consecutive signals.

2. A video record made by the method of claim 1.

3. A method as claimed in claim 1, wherein during the recording of the video information on the video record a picture synchronizing signal is used for locating the starting points of the discrete groups which each comprise two associated field periods.

4. A method as claimed in claim 1, wherein the first combined signal is constituted by the video signal of the first consecutive field and a vertical aperture correction signal derived therefrom and the second combined signal is constituted by the video signal of the second field and a correction signal formed as an aperture correction signal from a video signal of the first consecutive field, which video signal is delayed by substantially a field period, and the video signal of the second consecutive field.

5. A method as claimed in claim 1, wherein the first combined signal is constituted by the video signal of the first consecutive field and a vertical aperture correction field derived therefrom and the second combined signal is constituted by the video signal of the first consecutive field, which signal is delayed by substantially a field period, and a vertical aperture correction signal derived from the video signal of the second consecutive field.

6. A method as claimed in claim 1, wherein the combined group information of the two associated field is constituted for the first field by the video signal of said field and a video signal of the preceding field, which signal is delayed by substantially a field period, and for the second field by the video signal of the first field, which signal is delayed by substantially a field period, and the video signal of the said preceding field, which signal is delayed by substantially two field periods.

7. A method as claimed in claim 1, wherein the combined group information of the two associated fields is constituted for the first field by the video signal of said field and a video signal of the preceding field, which signal is delayed by substantially a field period, while the delay is reduced by a line period for obtaining the information of a subjacent line with respect to that present in the first field and is increased by a line period for obtaining the information of a superjacent line with respect to that present in the first field, the information for the second field being constituted by the video signal of the said preceding field, which signal is delayed by substantially two field periods, and the video signal of the first field, which signal is delayed by substantially one field period, while the delay is reduced by one line period for obtaining the information of a subjacent line with respect to that present in the said preceding field and is increased by one line period for obtaining the information of a superjacent line with respect to that present in the said preceding field.

8. A method as claimed in claim 1, wherein for a color television system with color information in the form of color signals and luminance information in the form of a luminance signal which corresponds with a color signal combination the said signal combination in the groups of two field periods each only occurs for the luminance signal, while in each group of two field periods the color information for both field periods is the same.

9. An apparatus for manufacturing a video record containing video information provided in circular tracks and intended for reproduction by a television display apparatus, said video information to be recorded occurring in field periods and line periods, two successive field periods comprising an interlaced picture in the display device, said display apparatus being capable by selectively displaying more than two successive field periods for producing a television picture containing motion and for repeatedly displaying two sequential recorded field periods for obtaining a stop-motion television picture, said record manufacturing apparatus comprising means for dividing said video information to be recorded in groups of two consecutive fields, delay means for phase displacing at least one of said two consecutive fields to be recorded by at least one horizontal line period, means for combining as a first combined signal the video information directly from a first of said two consecutive fields with the phase displaced video information from one of two consecutive fields to be recorded, means for recording said first combined signal on a semi-circular portion of a first track of said record, means for combining as a second combined signal the second of said two consecutive fields to be recorded with the phase displaced information from one of said two consecutive fields to be recorded, and means for recording said second combined signal in the unrecorded semi-circular portion of said first track, at least one of said first and said second combined signals being a combination of both of said first and second consecutive signals.

10. Apparatus as claimed in claim 9, further comprising a vertical aperture correction circuit which comprises a series combination of a first and a second delay device which each have a delay time equal to a line period, which series combination is connected to an input terminal of the apparatus, the second delay device of the series combination being shunted by a first superposition stage the output terminal of which is connected to a delay device having a delay time of substantially a field period, a switching device being included in the vertical aperture correction circuit and having its input terminals connected to the output terminal of the delay device having the delay time of substantially one field period, and to the junction of the delay devices of the series combination, while the output terminal of the switch is connected to an input terminal of a second superposition stage which by two other input terminals is connected in parallel with the said series combination of delay devices, the output terminal of the second superposition stage being connected to a first input terminal of a third superposition stage a second input terminal of said third superposition stage being connected to the said junction of the two delay devices in the series combination, the output terminal of said third superposition stage being connected to the first-mentioned output terminal of the apparatus.

11. Apparatus as claimed in claim 9, further comprising a vertical aperture correction circuit which comprises a series combination of a first and a second delay device which each have a delay time equal to a line period, which series combination is connected to the input terminal of the apparatus, the second delay device of the series combination being shunted by a first superposition stage the output terminal of which is connected to a delay device having a delay time of substantially a field period, the output terminal of this device being connected to an input terminal of a switching device the other input terminal of which is connected to a junction of the said series-connected delay devices, two of three input terminals of a second superposition stage forming part of the vertical aperture correction circuit being connected in parallel with the said series combination of delay devices and a third of said three input terminals being connected to the said junction, the output terminal of the second superposition stage being connected to an input terminal of the third superposition stage, a further input terminal of said third superposition stage being connected to the output terminal of the switching device, the output terminal of the third superposition stage being connected to the first-mentioned output terminal of the apparatus.

12. Apparatus as claimed in claim 10, wherein there is included between the said second and third superposition stages a second switching device which switches in each field period, two switch output terminals each being connected to a signal amplitude multiplier stage.

13. Apparatus as claimed in claim 9, wherein there is connected to the input terminal of the device the series combination of a first and a second delay device which each have a delay time substantially equal to a field period, a first and second superposition stage having input terminals connected in parallel with the said first and second delay device respectively, while output terminals of the first and the second superposition stages are connected to the input terminals of the said switching device.

14. Apparatus as claimed in claim 13, wherein the delay time equal to substantially a field period of the said first delay device and the delay time equal to substantially a field period of the second delay device differ in time by a line period.

15. Apparatus as claimed in claim 13, wherein between the said first and second delay devices which each have a delay time substantially equal to the field period there is connected a third delay device having a delay time equal to a line period, the said first and second superposition stages each having a third input terminal which is connected to a junction of the said third delay device and the said first and second delay device respectively.

16. Apparatus as claimed in claim 13, wherein the input terminals of the first and second superposition stages are connected to the delay devices via signal amplitude multiplier stages.

17. Apparatus as claimed in claim 9, comprising a switching device which switches in each field period and has two input terminals and an output terminal which is connected to the input terminal of a delay device having a delay time substantially equal to a field period, which delay device is suitable for simultaneously receiving a signal and delivering a delayed signal, a first input terminal of the said switching device being connected to the input terminal of the apparatus and its second input terminal is connected to the output terminal of a first superposition stage which has two input terminals one of which is coupled to the input terminal of the apparatus while the other is connected to the output terminal of the said delay device.

18. Apparatus as claimed in claim 17, wherein between the output terminal of the said delay device having a delay time substantially equal to the field period and the input terminal of the said first superposition stage there is connected a second delay device having a delay time equal to a line period.

19. Apparatus as claimed in claim 18, wherein the output terminal of the said delay device having a delay time substantially equal to a field period is connected to an input terminal of the a second switching device and to an input terminal of a second superposition stage another input terminal of which is connected to the input terminal of the apparatus while its output terminal is connected to the other input terminal of the second switching device.

20. Apparatus as claimed in claim 17, wherein between the input terminal of the apparatus at the first input terminal of the said first switching device there is connected a second delay device having a delay time equal to a line period, which second delay device is shunted by a second superposition stage the output terminal of which is connected to the first input terminal of the first superposition stage, while the output terminal of a delay device having a delay time substantially equal to a field period is connected, via a third delay device having a delay time equal to a line period, to a first input terminal of the second switching device, the third delay device, which has a delay time equal to the line period, being shunted by a third superposition stage the output terminal of which is connected to a first input terminal of a fourth superposition stage a second input terminal of which is connected to the output terminal of the said second delay device having a delay time equal to the line period, while the output terminal of said fourth superposition stage is connected to a second input terminal of the second switching device.

21. Apparatus as claimed in claim 9, suitable for application in a color television system, wherein the apparatus is provided with a circuit for supplying to outputs thereof a luminance signal having a full bandwidth and two color-difference signals having limited bandwidths, the circuit output with the luminance signal being connected to a device for supplying as a first device output a video signal combination in different groups each of two associated fields while each circuit output with a color-difference signal is connected to an input of a respective delay device having a delay time of substantially a field period, the circuit output with the color-difference signal and the output of the delay device being connected via switch-over device which switches once per field period to an encoding circuit, to an input of which also the said first device output is connected.

22. Apparatus as claimed in claim 9 suitable for application in a color television system, wherein the apparatus is provided with a filtering circuit for supplying, (while a coded television signal is applied simultaneously) to outputs thereof a luminance signal having a full bandwidth and a chrominance signal having a limited bandwidth, the circuit output with the luminance signal being connected as a device for supplying to a first device output a video signal combination in separate groups each of two associated fields, while the circuit output with the chrominance signal is connected to an input of a delay device having a delay time of substantially a field period, the circuit output with the chrominance signal and the output of the delay device being connected via a switch-over device ( which switches once per field period) to a superposition stage to an input of which also the said first device output is connected.

23. Apparatus as claimed in claim 21, wherein the circuit output with the color-difference or chrominance signal is connected to the switch-over device via a delay device having a time delay of a line period.

24. Apparatus as claimed in claim 22, suitable for application in a color television system which operates in accordance with the PAL standard, wherein the output of the delay device having a delay time of substantially one field period is connected to the superposition stage via a phase shifting circuit.

* * * * *